(12) United States Patent
Casper et al.

(10) Patent No.: US 9,483,433 B2
(45) Date of Patent: *Nov. 1, 2016

(54) PROCESSING COMMUNICATION DATA IN A SHIPS PASSING CONDITION

(71) Applicant: International Business Machines Corporation, Armonk, NY (US)

(72) Inventors: Daniel F. Casper, Poughkeepsie, NY (US); John R. Flanagan, Poughkeepsie, NY (US); Roger G. Hathorn, Tucson, AZ (US); Catherine C. Huang, Poughkeepsie, NY (US); Matthew J. Kalos, Tucson, AZ (US); Louis W. Ricci, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,598

(22) Filed: May 20, 2015

(65) Prior Publication Data

US 2015/0254204 A1 Sep. 10, 2015

Related U.S. Application Data

(63) Continuation of application No. 12/031,182, filed on Feb. 14, 2008, now Pat. No. 9,052,837.

(51) Int. Cl.
*G06F 3/00* (2006.01)
*G06F 13/40* (2006.01)
(Continued)

(52) U.S. Cl.
CPC ......... *G06F 13/4027* (2013.01); *G06F 3/0607* (2013.01); *G06F 3/0619* (2013.01); *G06F 3/0659* (2013.01); *G06F 3/0661* (2013.01); *G06F 3/0689* (2013.01); *G06F 13/28* (2013.01)

(58) Field of Classification Search
None
See application file for complete search history.

(56) References Cited

U.S. PATENT DOCUMENTS 3,693,161 A 9/1972 Price et al.
3,943,283 A 3/1976 Caragliano et al.
(Continued)

FOREIGN PATENT DOCUMENTS

DE 3931514 3/1990
GB 1264096 2/1972
(Continued)

OTHER PUBLICATIONS

Z/Series Input/Output Configuration Program user's Guide for IYP IOCP, SB10-7029-03c. International Business Machines Corporation, Jun. 2003, 372 pages.
(Continued)

*Primary Examiner* — Henry Tsai
*Assistant Examiner* — Aurangzeb Hassan
(74) *Attorney, Agent, or Firm* — Cantor Colburn LLP; Steven Chiu

(57) ABSTRACT

Articles of manufacture, apparatuses, and methods for processing communication data in a ships passing condition are disclosed. Embodiments include a computer program product for performing a method including: obtaining a Transport Command Control Block (TCCB) from a location in memory specified by a Transport Command Control Block address of a Transport Control Word; opening a first exchange and sending, by a channel subsystem, the TCCB in the first exchange to a control unit; receiving, by the channel subsystem, an unsolicited first message in a second exchange from the control unit, the unsolicited first message opening the second exchange, the second exchange being a different exchange than the first exchange; and sending, by the channel subsystem, a second message to the control unit in a third exchange, the second message comprising a status of the first message, the second message configured to open and close the third exchange.

25 Claims, 16 Drawing Sheets

(51) Int. Cl.
*G06F 3/06* (2006.01)
*G06F 13/28* (2006.01)

(56) References Cited

U.S. PATENT DOCUMENTS

| | | |
|---|---|---|
| 4,004,277 A | 1/1977 | Gavril |
| 4,080,649 A | 3/1978 | Calle et al. |
| 4,207,609 A | 6/1980 | Luiz et al. |
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,321 A | 4/1994 | Bell et al. |
| 5,301,323 A | 4/1994 | Maeurer et al. |
| 5,317,739 A | 5/1994 | Elko et al. |
| 5,325,492 A | 6/1994 | Bonevento et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,463,736 A | 10/1995 | Elko et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,608,898 A | 3/1997 | Turpin et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,787,071 A | 7/1998 | Basso et al. |
| 5,793,983 A | 8/1998 | Albert et al. |
| 5,805,808 A | 9/1998 | Hansani et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,070,070 A | 5/2000 | Ladue |
| 6,125,399 A | 9/2000 | Hamilton |
| 6,125,411 A | 9/2000 | Sato |
| 6,128,311 A | 10/2000 | Poulis et al. |
| 6,195,330 B1 | 2/2001 | Sawey et al. |
| 6,202,095 B1 | 3/2001 | Beardsley et al. |
| 6,230,218 B1 * | 5/2001 | Casper .............. G06F 13/126 709/237 |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,401,223 B1 | 6/2002 | Depenning |
| 6,460,087 B1 | 10/2002 | Saito et al. |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,654,954 B1 | 11/2003 | Hicks |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,718,419 B1 | 4/2004 | Delvaux |
| 6,738,647 B1 | 5/2004 | Link, II |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,922,548 B1 | 7/2005 | Moore et al. |
| 6,950,888 B1 | 9/2005 | Rooney et al. |
| 6,963,940 B1 | 11/2005 | Glassen et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,142,520 B1 | 11/2006 | Haverinen et al. |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,266,296 B2 | 9/2007 | Ovadia et al. |
| 7,277,387 B2 | 10/2007 | Sanders et al. |
| 7,292,597 B2 | 11/2007 | Mills et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |

(56) References Cited

U.S. PATENT DOCUMENTS

| | | |
|---|---|---|
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,630,405 B1 | 12/2009 | Gao et al. |
| 7,631,128 B1 | 12/2009 | Sgrosso et al. |
| 7,668,984 B2 | 2/2010 | Gregg et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 7,941,570 B2 | 5/2011 | Flanagan et al. |
| 8,169,938 B2 | 5/2012 | Duchscher et al. |
| 8,478,915 B2 | 7/2013 | Gainey, Jr. et al. |
| 8,495,253 B2 | 7/2013 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0002492 A1 | 1/2003 | Gallagher et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0193029 A1 | 9/2005 | Rom et al. |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005810 A1 | 1/2007 | Halleck et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada et al. |
| 2008/0256264 A1 | 10/2008 | Muto et al. |
| 2008/0273518 A1 | 11/2008 | Pratt et al. |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0172301 A1 | 7/2009 | Ebersole et al. |
| 2009/0201537 A1 | 8/2009 | Araya |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0030919 A1 | 2/2010 | Flanagan et al. |
| 2010/0030920 A1 | 2/2010 | Casper et al. |
| 2010/0064072 A1 | 3/2010 | Tang et al. |
| 2010/0299460 A1 | 11/2010 | Wang |
| 2011/0113159 A1 | 5/2011 | Casper et al. |
| 2011/0173640 A1 | 7/2011 | Kreuzenstein et al. |
| 2012/0110222 A1 | 5/2012 | Dang et al. |
| 2012/0311390 A1 | 12/2012 | Bubb et al. |
| 2013/0047042 A1 | 2/2013 | Bubb et al. |

FOREIGN PATENT DOCUMENTS

| | | |
|---|---|---|
| GB | 2291990 | 2/1996 |
| JP | 61123970 A | 6/1986 |
| JP | 63236152 | 10/1988 |
| JP | 2010140127 A | 6/2010 |
| WO | 0235367 A1 | 5/2002 |
| WO | 2006102664 A2 | 9/2006 |

OTHER PUBLICATIONS

Aboda, B.-et al.; Network Working Group; "Securing Block Storage Protocols Over IP"; ACM Digital Library; RFC3723; Apr. 2004, 66 pages.

Azimi, R.-et al.; "miNI: Reducing Network Interface Memory Requirements with Dynamic Handle Lookup"; ACM Digital Library; pp. 261-272; Jun. 2003.

Emulex Corporation; "Install the LP850 Host Adapter"; Google/ Emulex Corporation, LightPulse LP850 Fibre Channel PCI Host Adapter Manuals; pp. 1-10, 1999.

Foong, A.-et al.; "Towards SSD-Ready Enterprise Platforms"; Google/Intel Corporation; 2008-2009, 7 pages.

(56) References Cited

OTHER PUBLICATIONS

Hewlett-Packard Company; HP A4800A PCI FWD SCSI Host Bus Adapter—Service & User Guide, Edition 6; Google/H-P; 2001, pp. 1-64.
Hewlett-Packard Company; "HP A5149 PCI Ultra2 SCSI Host Bus Adapter—Service and User Guide", Edition 2; Google/H-P; 2001, pp. 1-66.
Jiang, J.-et al.; "The Role of FCoE in I/O Consolidation"; ACM Digital Library/International Conf on Advanced Infocomm Technology '08; Jul. 2008, pp. 1-6.
Josephson, WK.-et al.; "DFS: A File System for Virtualized Flash Storage"; ACM Digital Library; vol. 6, No. 3, Article 14, Sep. 2010, pp. 1-15.
LSI Corporation; "PCI Express to 6Gb/s SAS Host Bus Adapters"; Google; Chapter 1, Introduction/Overview; LSI User Guide; Oct. 2009, pp. 1-28.
LSI; "ScsiPortGetDeivceBase"; Google/LSI; Apr. 2003, pp. 1-3.
Magoutis, K.; "The Optimistic Direct Access File System: Design and Network Interface Support"; Division of Engineering & Applied Science, Harvard Univ.; Feb. 2002, pp. 1-7.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007, pp. 1-7.
Petersen, MK.-et al.; "DIF/DIX Aware Linux SCSI HBA Interface"; Google; Oracle Linux Engineering; Jul. 2008, pp. 1-258.
Satran, J.-et al.; Network Working Group; "Internet Small Computer Systems Interface (iSCSI)"; ACM Digital Library; RFC3720; Apr. 2004, pp. 1-258.
Sun, Oracle; "Sun Storage 6 Gb SAS PCIe HBA, External—Installation Guide for HBA Models"; Google; Revision A; Nov. 2010, 80 pages.
U.S. Appl. No. 13/024,468, Non Final Office Action Mailed Jan. 26, 2012, 58 pages.
U.S. Appl. No. 13/351,073, Non Final Office Action Mailed Mar. 30, 2012, 8 pages.
U.S. Appl. No. 12/030,912, Final Office Action Mailed Feb. 27, 2012, 25 pgs.
U.S. Appl. No. 12/031,023, Non-Final Office Action Mailed Feb. 1, 2012, 37 pages.
URL, http://en.wikipedia.org/wiki/FICON, FICON, Wikipedia, USA, Wikimedia Foundation, Inc., Aug. 9, 2011, 3 pages.
U.S. Appl. No. 12/030,912 Non Final Office Action Mailed Aug. 18, 2011, 35 pages.
U.S. Appl. No. 12/030,981 Non Final Office Action Mailed Aug. 2, 201, 59 pages.
U.S. Appl. No. 12/031,042, Non-Final Office Action Mailed Sep. 30, 201, 20 pages.
U.S. Appl. No. 12/031,182 Final Office Action dated Oct. 20, 2011, 10 pages.
U.S. Appl. No. 12/031,182 Non-Final Office Action dated Mar. 16, 2012, 18 pages.
Vaghani, SB.; "Virtual Machine File System"; VMWare Inc./ACM Digital Library; pp. 57-69; 2008-2009.
"Fibre Channel Single Byte Command Code Sets—2 Mapping Protocol (FC-SB-3)" T11/Project 1357-D/Rev 1.6, INCITS Mar. 2003, 206 pgs., American National Standards Institute.
"Information Technology—Fibre Channel Protocol for SCSI, Third Version (FCP-3)," T10 Project 1560-D, Revision 4g, Sep. 13, 2005, 140 pages.
ANSI INCITS 433-2007, Information Technology Fibre Channel Link Services (FC-LS), Jul. 2007, 211 pages.
Behrs, Jr, "Adaptive Prediction Minimizes Data Overrun and Underrun", IBM, Nov. 1994, pp. 1-3. http:// priorartdatabase.com/ IPCOM/000114189.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.

Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.
U.S. Pat. No. 7,373,435 Non-Final Office Action Sep. 13, 2007.
U.S. Pat. No. 7,373,435 Non-Final Office Action Jun. 11, 2007.
U.S. Pat. No. 7,600,053 Non-Final Office Action dated Mar. 17, 2009.
U.S. Appl. No. 12/031,023, Final Office Action Mailed Nov. 18, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S. Appl. No. 12/030,951, Final Office Action Mailed Oct. 26, 2010.
U.S. Appl. No. 12/030,975 Non-Final Office Action dated Oct. 22, 2009.
U.S. Appl. No. 12/030,975. Final Office Action Mailed May 13, 2010.
U.S. Appl. No. 12/030,993, Final Office Action Mailed Dec. 10, 2010.
U.S. Appl. No. 12/031,021 Non-Final Office Action dated Jan. 8, 2010.
U.S. Appl. No. 12/031,201, Final Office Action Mailed Aug. 3, 2010.
U.S. Appl. No. 12/031,201, Non-Final Office Action Mailed Dec. 27, 2010.
U.S. Appl. No. 12/030,912 Non-Final Office Action dated Mar. 18, 2010.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,023 Non-Final Office Action dated Oct. 29, 2009.
U.S. Appl. No. 12/183,305, filed Jul. 31, 2008.
U.S. Appl. No. 12/183,315, filed Jul. 31, 2008.
U.S. Appl. No. 12/030,951 Non-Final Office Action dated Nov. 23, 2009.
U.S. Appl. No. 12/030,932 Non-Final Office Action dated Dec. 16, 2009.
U.S. Appl. No. 11/126,728 Non-Final Office Action Apr. 16, 2007.
U.S. Appl. No. 11/469,573 Non-Final Office Action dated Apr. 11, 2008.
U.S. Appl. No. 11/965,866 Non-Final Office Action dated Jun. 3, 2010.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/030,920 Non-Final Office Action dated Feb. 23, 2010.
U.S. Appl. No. 12/030,939 Non-Final Office Action dated Nov. 16, 2009.
U.S. Appl. No. 12/030,951 Non-Final Office Action dated May 20, 2010.
U.S. Appl. No. 12/030,961 Non-Final Office Action dated Dec. 17, 2009.
U.S. Appl. No. 12/030,985, Non Final Office Action Mailed May 5, 2010.
U.S. Appl. No. 12/031,038 Non-Final Office Action dated Nov. 16, 2009.
U.S. Appl. No. 12/031,038, Non-Final Office Action Mailed Apr. 15, 2010.
U.S. Appl. No. 12/031,182 Final Office Action Mailed Jul. 22, 2010.

(56) References Cited

OTHER PUBLICATIONS

U.S. Appl. No. 12/031,182 Non-Final Office Action dated Jan. 22, 2010.
Final Office Action for U.S. Appl. No. 12/030,912 mailed Oct. 6, 2010, 31 pages.
GB1206682.5 Combined Search and Examination Report under Sections 17 and 18(3). Mailed on Jul. 25, 2012. 14 pages.
Germian Office Action for Application No. 10 2012 209 014.2, Mailed on Apr. 9, 2013, 3 pages.
International Search Report and Written Opinion for PCT/EP2009/051447 dated Jul. 1, 2009, 9 pages.
International Search Report and Written Opinion for PCT/EP2009/051483 dated Jul. 27, 2009, 9 pages.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
U.S. Appl. No. 12/181,662—Final Office Action dated Jan. 4, 2010, 10 pages.
U.S. Appl. No. 12/617,055, Non Final Office Action Mailed Jun. 23, 2011, 8 pages.
Written Opinion and International Search Report for PCT/EP2009/051463 dated Jul. 22, 2009, 9 pages.
U.S. Appl. No. 13/075,993 Non Final Office Action Mailed Jul. 19, 2012, 14 pages.
U.S. Appl. No. 12/030,912, Non Final Office Action Mailed Oct. 4, 2012, 25 pages.
U.S. Appl. No. 13/075,993, Final Office Action Mailed Feb. 13, 2012, 21 pages.
U.S. Appl. No. 13/150,539, Non-Final Office Action Mailed Mar. 2, 2012, 58 pages.
U.S. Appl. No. 13/150,583, Non-Final Office Action Mailed Feb. 3, 2012, 57 pages.
U.S. Appl. No. 13/173,772 Non Final Office Action Mailed Feb. 3, 2012, 61 pages.
U.S. Appl. No. 13/173,733, Non-Final Office Action Mailed Feb. 7, 2012, 55 pages.
U.S. Appl. No. 12/031,182, Non Final Office Action Mailed Dec. 23, 2010, 11 pages.
Written Opinion and International Search Report for PCT/EP2009/051459 dated Jun. 23, 2009, 8 pages.
"Protocol for Insochronous Traffic Over Fiber Channel Switching"; IBM Technical Disclosure Bulletin; vol. 37, No. 06B; Jun. 1994. pp. 377-380.
"z/Architecture-Principles of Operation," IBM Publication No. SA22-7832-04, 5th Ed., Sep. 2005, pp. 1-1144.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments. Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
International Search Report; International Application No. PCT/EP2009/059184; International Filing Date: Jul. 16, 2009; Date of mailing: Jan. 14, 2010; 9 pages.
Laudon et al.,"System Overview of the SGI Origin 200/2000 Product Line," 1997, iEEE Publication pp. 150-156.
Moore et al., "Reconfiguration of Storage Elements to Improve Performance", IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
U.S. Pat. No. 7,000,036 Non-Final Office Action dated Jul. 15, 2005, 1 page.
U.S. Pat. No. 7,174,274 Non-Final Office Action dated Jun. 8, 2006, 1 page.
Peterson; "Information Techonology, Fibre Channel Protocol for SCSI, Fourth Version (FCP-3)", Draft Proposed American National Standard, Jun. 2004; pp. 1-142.
Sachs, M.W.; "I/O Marker Changing"; IBM Technical Disclosure Bulletin; vol. 37, No. 02A; Feb. 1994; pp. 75-76.
SCSI Primary Commands—4 (SPC-4); Project T10/1731-D. Rev 11. INCITS Apr. 14, 2010, 785 pages (Part 1, pp. 1-390; Part 2, pp. 391-785).
Simmons et al.; "A Performance Comparison of Three Supercomputers: Fujitsu VP-2600, NEC SX-3, and CRAY Y-MP"; ACM, Conference on High Performance Networking and Computing, Jul. 1991 ACM/IEEE conference on Supercomputing, Albuquerque, NM; pp. 150-157.
Snively, et al.; "Fibre Channel, Framing and Signaling"; (FC-FS) Rev. 1.70; NCITS Working Draft Proposed American National Standard for Information Technology; Feb. 2002; pp. 1-575.
Snively, et al.; "Fibre Channel Single Byte Command Code Sets-3 Mapping Protocol (FC-SB-3)"; T11/Project 1357-D/ Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/030,954 Non-Final Office Action dated Jan. 21, 2010, 20 pages.
U.S. Appl. No. 12/031,201 Non-Final Office Action dated Jan. 25, 2010, 14 pages.
U.S. Appl. No. 12/183,323, Non-Final Office Action Mailed Jan. 3, 2011, 18 pages.
U.S. Appl. No. 12/031,042, Final Office Action Mailed Oct. 25, 2010, 27 pages.
U.S. Appl. No. 12/183,323, filed Jul. 31, 2008, 54 pages.
U.S. Appl. No. 12/364,615, Non Final Office Action Mailed Oct. 7, 2010, 51 pages.
U.S. Appl. No. 12/030,954 Non Final Office Action mailed Jul. 12, 2010, 36 pages.
U.S. Appl. No. 12/030,961 Final Office Action mailed Jul. 12, 2010, 35 pages.
U.S. Appl. No. 12/030,989 Final Office Action dated May 24, 2010, 28 pages.
U.S. Appl. No. 12/030,993 Non Final Office Action mailed Jun. 28, 2010, 24 pages.
U.S. Appl. No. 12/031,023 Non Final Office Action mailed Jun. 11, 2010, 20 pages.
U.S. Appl. No. 12/031,042, Non-Final Office Action Mailed Apr. 5, 2010, 30 pages.
U.S. Appl. No. 12/183,305, Non-Final Office Action Mailed May 11, 2010, 34 pages.
U.S. Appl. No. 12/183,323 Non Final Office Action mailed Jul. 19, 2010, 42 pages.
Written Opinion and International Search Report for PCT/EP2009/051445 dated Jun. 25, 2009, 11 pages.
Written Opinion and International Search Report for PCT/EP2009/051446 dated Jun. 25, 2009, 8 pages.
Written Opinion and International Search Report for PCT/EP2009/051450 dated Jul. 7, 2009, 7 pages.
Written Opinion and International Search Report for PCT/EP2009/051461 dated Sep. 22, 2009, 7 pages.

(56) References Cited

OTHER PUBLICATIONS

Written Opinion and International Search Report for PCT/EP2009/051462 dated Jul. 1, 2009, 9 pages.
Z/Architecture, "Principles of Operation SA 22-7832-01 International Business Machines Corporation," 2nd Edition, Oct. 2001, pp. 1-1024.
U.S. Appl. No. 14/304,383, filed Mar. 13, 2014; Non-final office action mailed Jun. 3, 2014; 15 pages.
U.S. Appl. No. 14/543,368, filed Nov. 17, 2014; Final office action mailed Jul. 30, 2015; 71 pages.
U.S. Appl. No. 14/483,700, filed Sep. 11, 2015; Non-final office action, mailed Aug. 27, 2015; 63 pages.

\* cited by examiner

PROCESSING COMMUNICATION DATA IN A SHIPS PASSING CONDITION

DOMESTIC PRIORITY

The present application is a continuation of U.S. patent application Ser. No. 12/031,182 entitled "PROCESSING COMMUNICATION DATA IN A SHIPS PASSING CONDITION", filed Feb. 14, 2008, the entirety of which is specifically incorporated herein by reference.

BACKGROUND OF THE INVENTION

Field of the Invention

This invention relates, in general, to input/output processing, and in particular, to processing data associated with or generated by input/output processing.

DESCRIPTION OF BACKGROUND

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in it's own entity, to a control unit coupled to the channel. The control unit then processes the commands. The channel tracks the state of each command and controls when the next set of commands are to be sent to the control unit for processing. The channel ensures that each command is sent to the control unit in it's own entity. Further, the channel infers certain information associated with processing the response from the control unit for each command.

The control unit may also send various messages to the channel, such as acknowledgement messages indicating whether a command has been executed, and status messages providing information regarding the status of an I/O device.

The channel may send commands to the control unit in the form of Information Units (IUs). Various exchanges and sequences occur between the control unit and the channel. For example, the channel may open an exchange with the control unit and send various commands (command data) to the control unit. In response, in addition to performing other functions, the control unit may respond to the channel on the same exchange, or open a new exchange and send a response thereon.

In addition, the control unit may send unsolicited data to the channel, such as a message indicating the status of an I/O device, to which the channel may respond accordingly, such as with an acknowledgement ("ACK") message.

A condition may arise where a message sent from the channel arrives at the control unit at the same time that a message sent from the control unit arrives at the channel, or the messages otherwise cross paths in a logical path. In this condition, both the channel and control unit receive an unsolicited message in the absence of, or prior to, receiving a response to their respective messages. This condition may be referred to as a "frames passing" or "ships passing" situation.

For ships passing conditions occurring in channel subsytems using a common link protocol, such as the Fibre Connectivity (FICON) protocol, the inbound (toward the channel) and outbound (away from the channel) exchanges are used to resolve the condition. However, in situations where the channel and control unit use different protocols, there is no way to efficiently discontinue an operation.

Ships passing rules utilized in one protocol or mode may not work with other protocols or modes. For example, a first protocol, such as FICON, may not work with a second link protocol. The second link protocol may not be amiable to the FICON behavior, and thus there may be no way for the channel to efficiently discontinue the second link protocol operation.

Accordingly, there is a need in the art for a method and system for resolving ships passing conditions in channel communications. There is also a need in the art for resolving ships passing conditions among disparate link protocols.

BRIEF SUMMARY OF THE INVENTION

Embodiments of the invention include a computer program product for processing communication data in a ships passing condition, including a storage medium readable by a processing circuit and storing instructions for execution by the processing circuit for performing a method. The method includes: obtaining a Transport Command Control Block (TCCB) from a location in memory specified by a Transport Command Control Block address of a Transport Control Word; opening a first exchange and sending, by a channel subsystem, the TCCB in the first exchange to a control unit, the TCCB comprising a first logical path value and a first device value; receiving, by the channel subsystem, an unsolicited first message in a second exchange from the control unit, the unsolicited first message comprising a second logical path value and a second device value, the unsolicited first message opening the second exchange, the second exchange being a different exchange than the first exchange; responsive to the receiving the unsolicited first message and the first exchange and second exchange being opened, determining that the first logical path value is equal to the second logical path value and the first device value is equal to the second device value; and based on the determination, sending, by the channel subsystem, a second message to the control unit in a third exchange, the second message comprising a status of the first message, the second message configured to open and close the third exchange.

Other embodiments include an apparatus for processing communication data in a ships passing condition, including a channel subsystem for communication with a control unit. The channel subsystem includes one or more channels for directing information flow between memory and one or more I/O devices via the control unit, and is configured to perform a method. The method includes: obtaining a Transport Command Control Block (TCCB) from a location in memory specified by a Transport Command Control Block address of a Transport Control Word; opening a first exchange and sending the TCCB in the first exchange to a control unit, the TCCB comprising a first logical path value and a first device value; receiving an unsolicited first message in a second exchange from the control unit, the unsolicited first message comprising a second logical path value and a second device value, the unsolicited first message opening the second exchange, the second exchange being a different exchange than the first exchange; responsive to the receiving the unsolicited first message and the first exchange and second exchange being opened, determining that the first logical path value is equal to the second logical path value and the first device value is equal to the second device value; and based on the determination, sending a second message to the control unit in a third exchange, the second message comprising a status of the first message, the second message configured to open and close the third exchange.

Further embodiments include a method of processing communication data in a ships passing condition. The method includes: obtaining a Transport Command Control Block (TCCB) from a location in memory specified by a Transport Command Control Block address of a Transport Control Word; opening a first exchange and sending, by a channel subsystem, the TCCB in the first exchange to a control unit, the TCCB comprising a first logical path value and a first device value; receiving, by the channel subsystem, an unsolicited first message in a second exchange from the control unit, the unsolicited first message comprising a second logical path value and a second device value, the unsolicited first message opening the second exchange, the second exchange being a different exchange than the first exchange; responsive to the receiving the unsolicited first message and the first exchange and second exchange being opened, determining that the first logical path value is equal to the second logical path value and the first device value is equal to the second device value; and based on the determination, sending, by the channel subsystem, a second message to the control unit in a third exchange, the second message comprising a status of the first message, the second message configured to open and close the third exchange.

Other embodiments include an article of manufacture including at least one computer usable medium having computer readable program code logic to processing communications between a control unit and a channel subsystem in an input/output processing system. The computer readable program code logic performs a method including: sending a command in a first mode from the channel subsystem to the control unit; receiving a message in a second mode from the control unit at the channel subsystem; determining whether the message is responsive to the command; and responsive to the message being not responsive to the command, sending a response to the message to the control unit.

Additional embodiments include an apparatus for processing communications in an input/output processing system. The apparatus includes a channel subsystem of a host computer system in communication with a control unit capable of commanding and determining status of an I/O device. The channel subsystem performs: sending a command in a first mode to the control unit; receiving a message in a second mode from the control unit; determining whether the message is responsive to the command; and responsive to the message being not responsive to the command, sending a response to the message in the second mode to the control unit.

Other additional embodiments include an apparatus for processing communications in an input/output processing system. The apparatus includes a control unit capable of commanding and determining status of an I/O device, the control unit in communication with a channel subsystem of a host computer system. The control unit performs: sending a message in a first mode to the channel subsystem; receiving a command in a second mode from the channel subsystem; determining whether the command is responsive to the message; and responsive to the command being not responsive to the message, determining whether to perform one of i) executing the command and ii) terminating the command.

Further embodiments include a method of processing communications between a control unit and a channel subsystem in an input/output processing system. The method includes: sending a message from the control unit to the channel subsystem; receiving a command from the channel subsystem at the control unit; determining whether the command is responsive to the message; and responsive to the command being not responsive to the message, determining whether to perform one of i) executing the command and ii) terminating the command.

Still further embodiments include a method of processing communications between a control unit and a channel subsystem in an input/output processing system. The method includes: sending a command in a first mode from the channel subsystem to the control unit; receiving a message in a second mode from the control unit at the channel subsystem; determining whether the message is responsive to the command; and responsive to the message being not responsive to the command, sending a response to the message to the control unit.

Other systems, methods, and/or articles of manufacture according to embodiments will be or become apparent to one with skill in the art upon review of the following drawings and detailed description. It is intended that all such additional systems, methods, and/or articles of manufacture be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
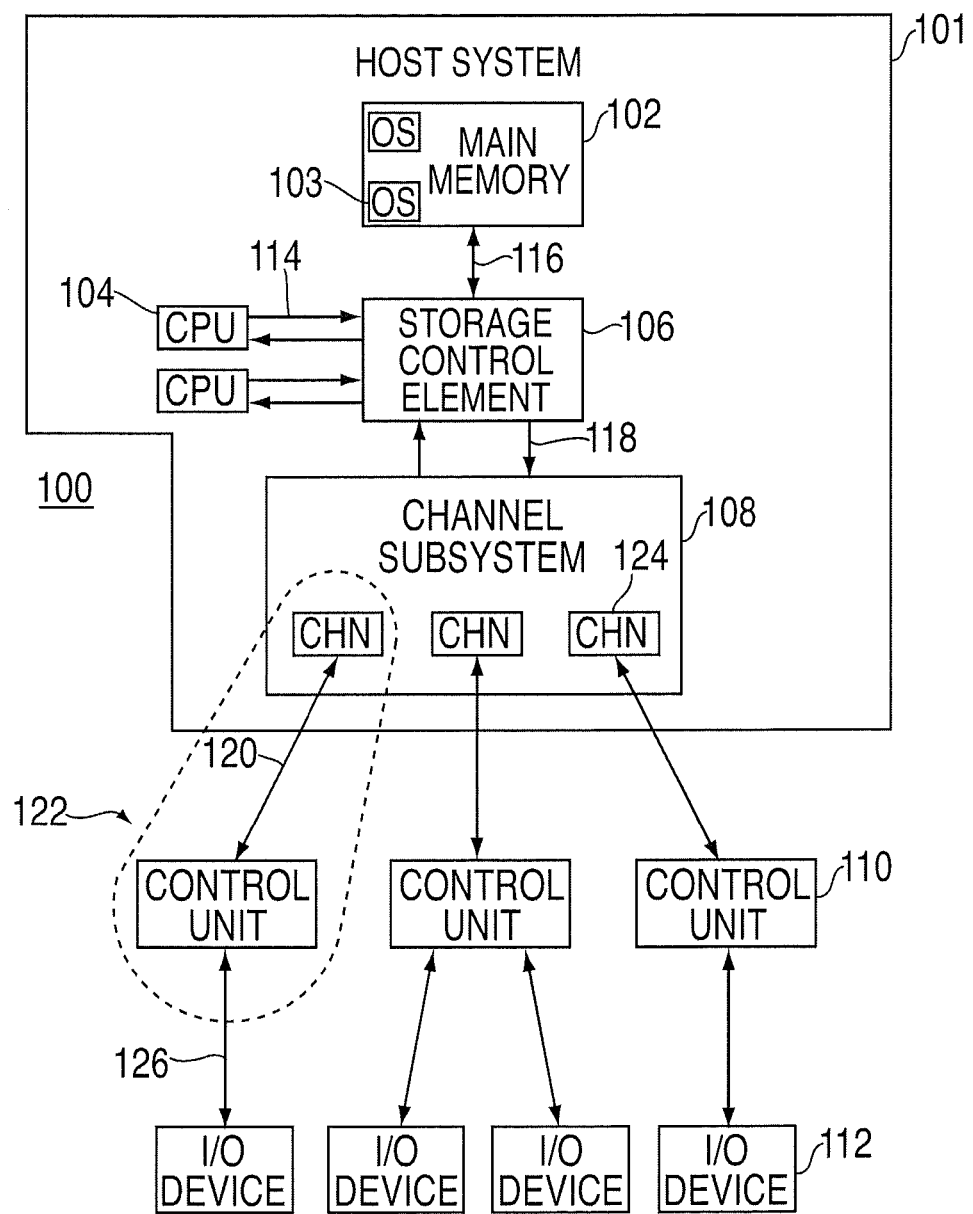
FIG. 1 depicts an exemplary embodiment of a processing environment incorporating and using one or more aspects of the present invention.

The detailed description explains the preferred embodiments of the invention, together with advantages and features, by way of example with reference to the drawings.

DETAILED DESCRIPTION OF THE INVENTION

Exemplary embodiments provide a system and method for processing data sent between a control unit and channel in a "ships passing" condition. The system allows for the control unit to determine whether to execute or terminate an operation in response to command data from the channel. In an exemplary embodiment, the system and method allow for processing messages sent between the channel and the control unit in a ships passing condition, where the protocol used by the channel is different than the protocol used by the control unit.

I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message including status and extended status information in response to executing the channel program. The control unit may also generate a response message without executing the channel program under a limited number of communication scenarios, e.g., to inform the I/O communications adapter that the channel program will not be executed. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and performs further calculations using the extracted information, such as determining an extended measurement word.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, point-ing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
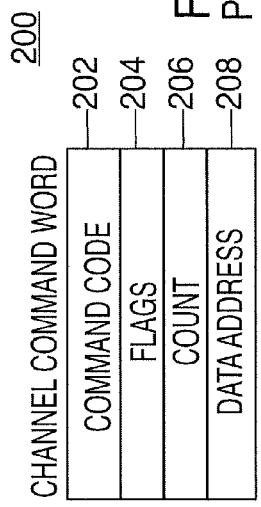
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

An example of a link protocol used for processing the TCW channel program is a "Transport Mode", using the FCP link protocol, that allows the collapse of multiple chained CCWs into one TCCB inside a single Transport Command information unit (IU). This IU may send the entire channel program to the control unit in one sequence.

Figure 5:
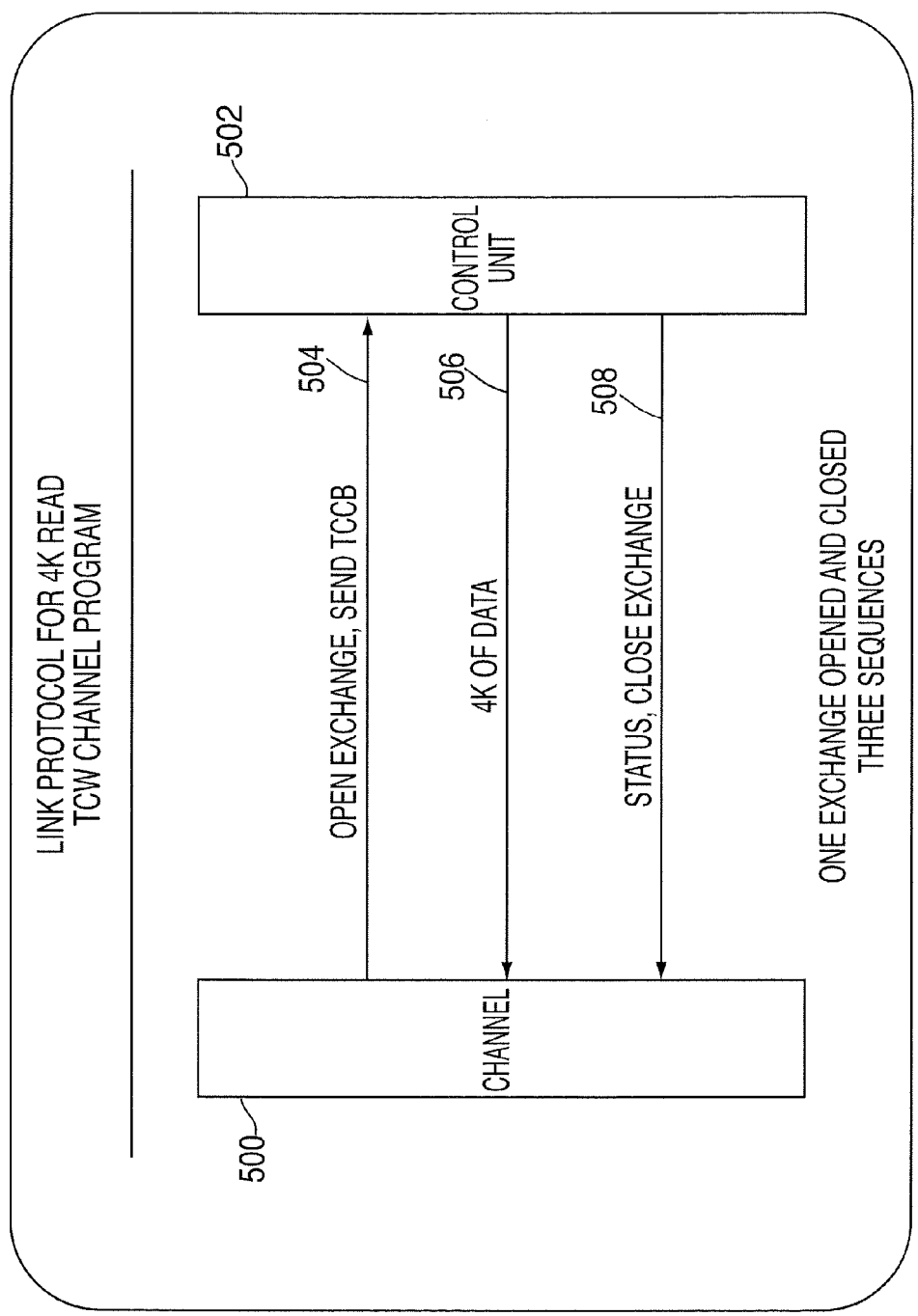
FIG. 5 depicts an exemplary embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP_IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502.
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
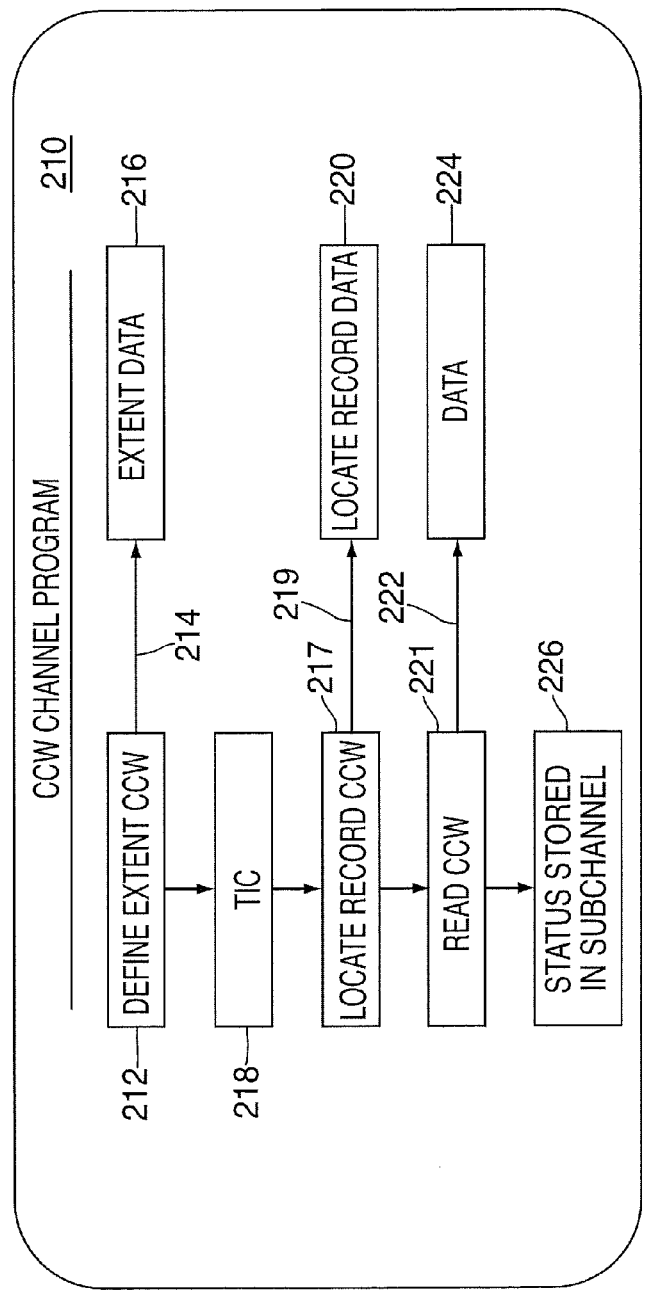
FIG. 2B depicts one example of a prior art channel command word channel program.
Figure 3:
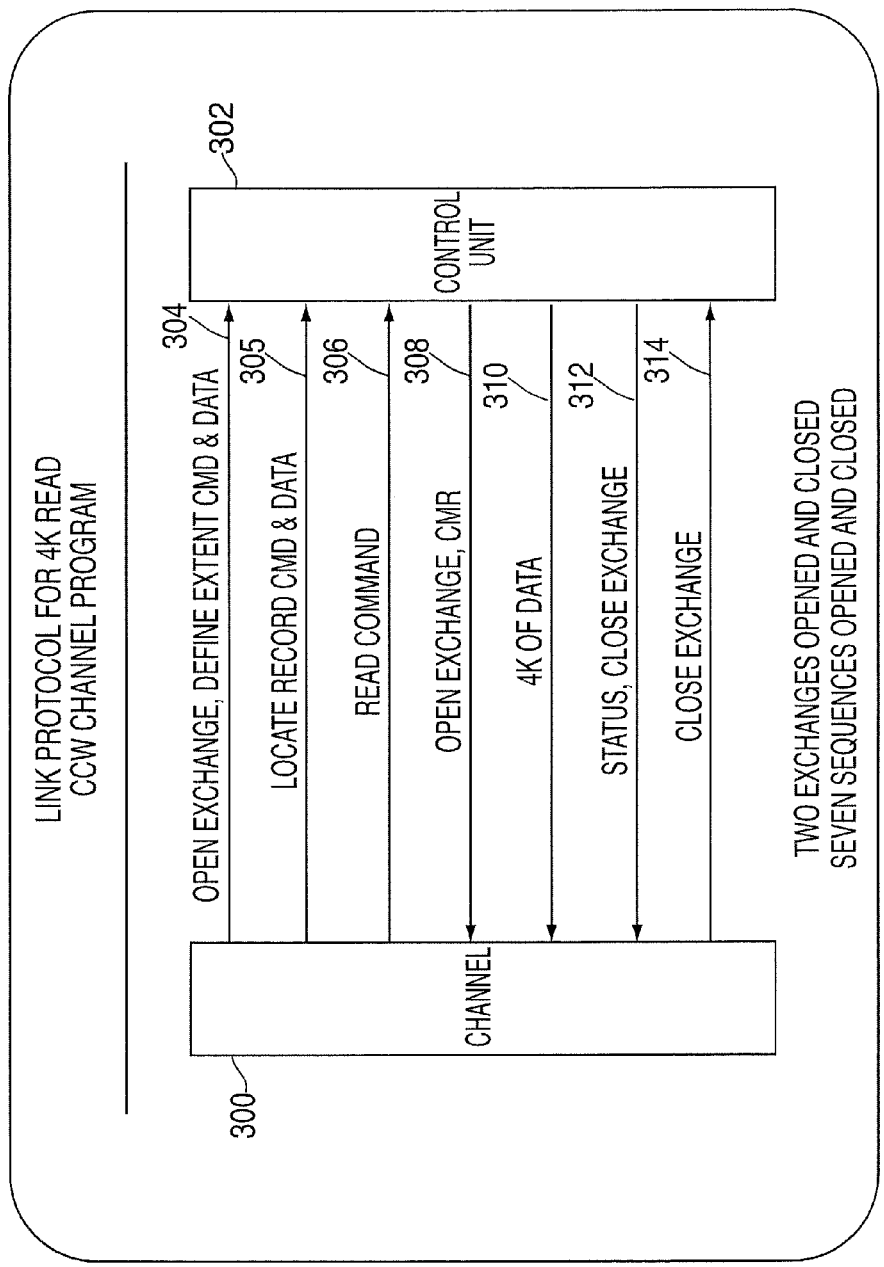
FIG. 3 depicts an exemplary embodiment of a prior art link protocol used in communicating between the channel and control unit to execute the channel command word channel program of FIG. 2B.
Figure 4:
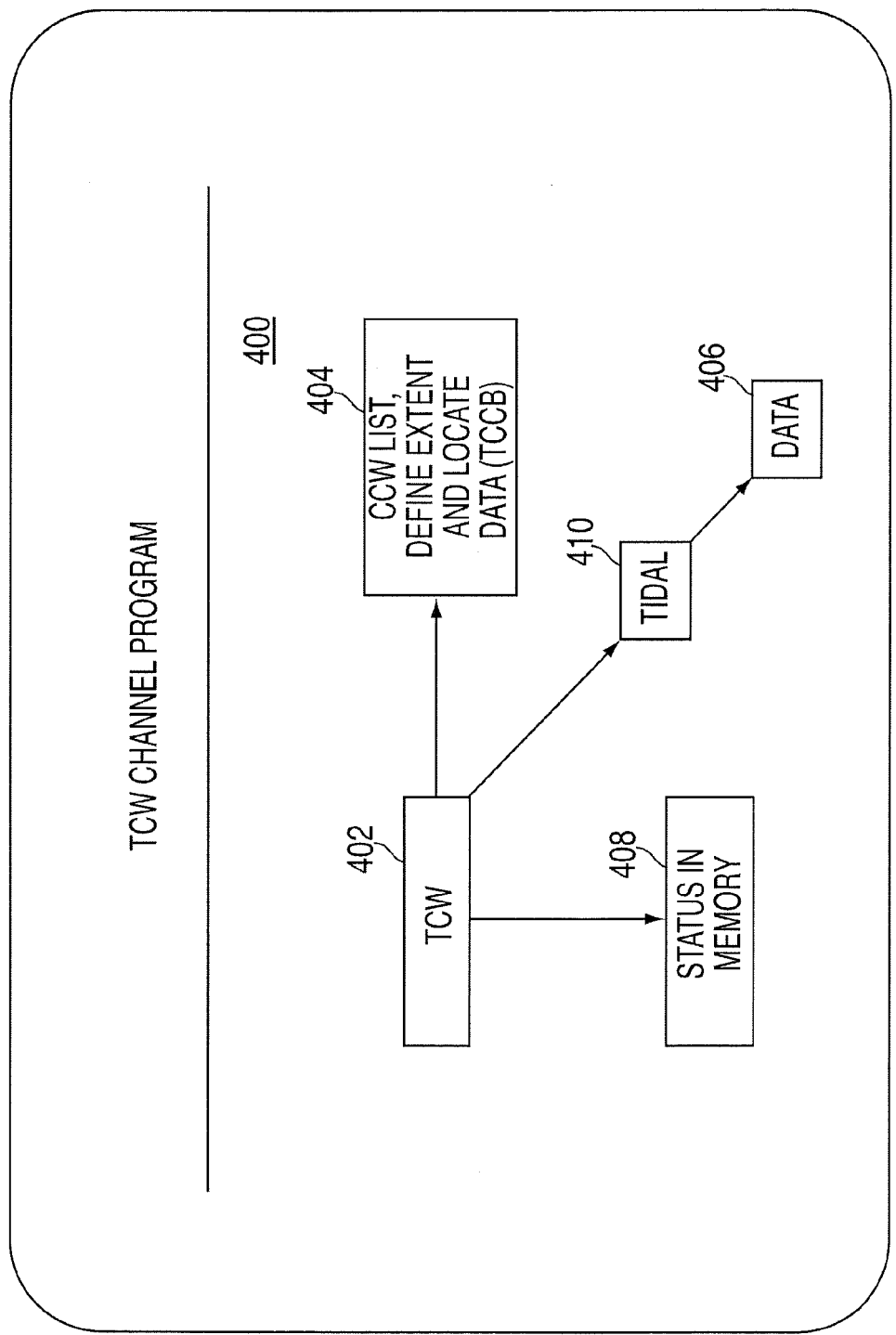
FIG. 4 depicts an exemplary embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
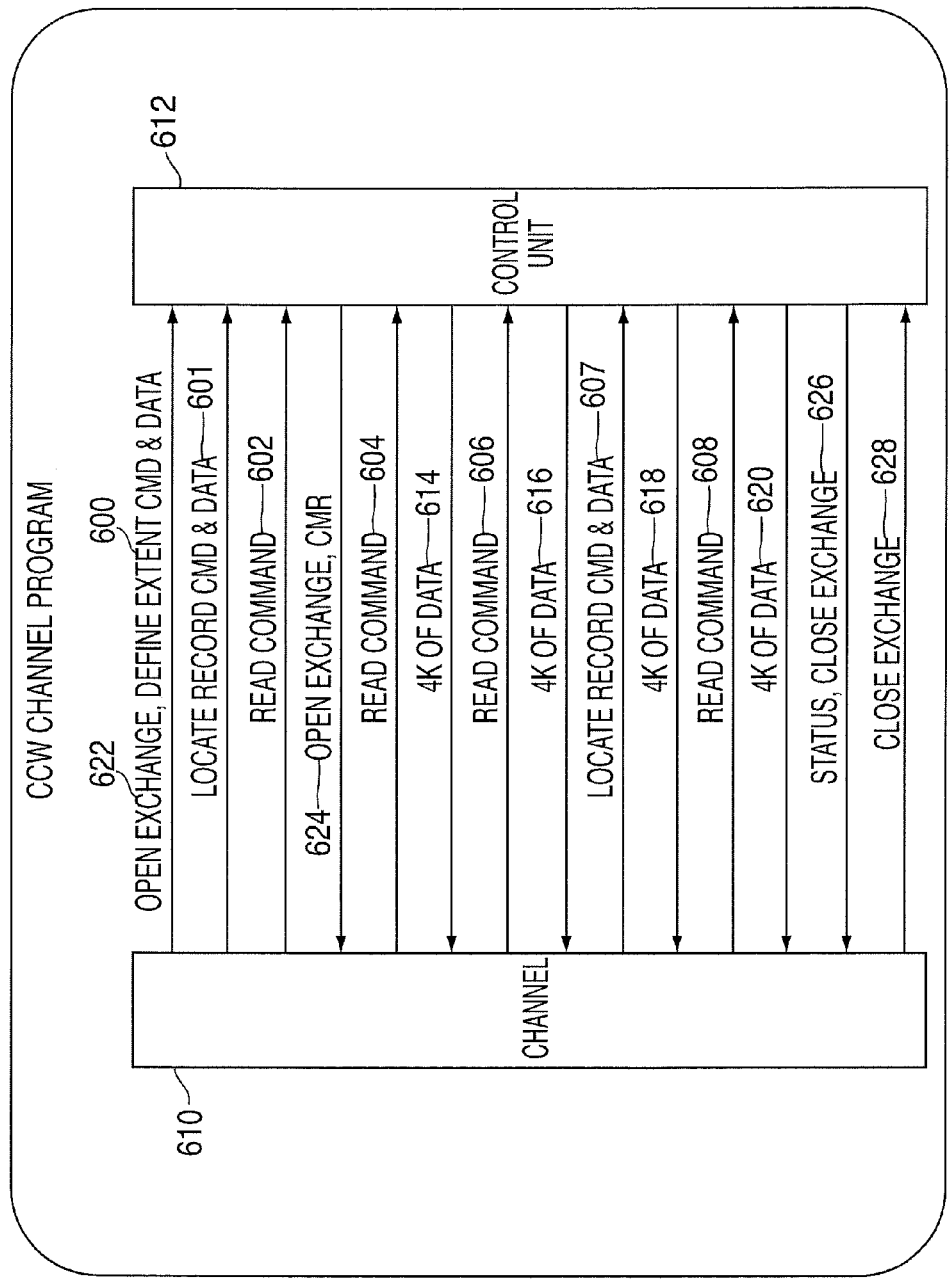
FIG. 6 depicts an exemplary embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
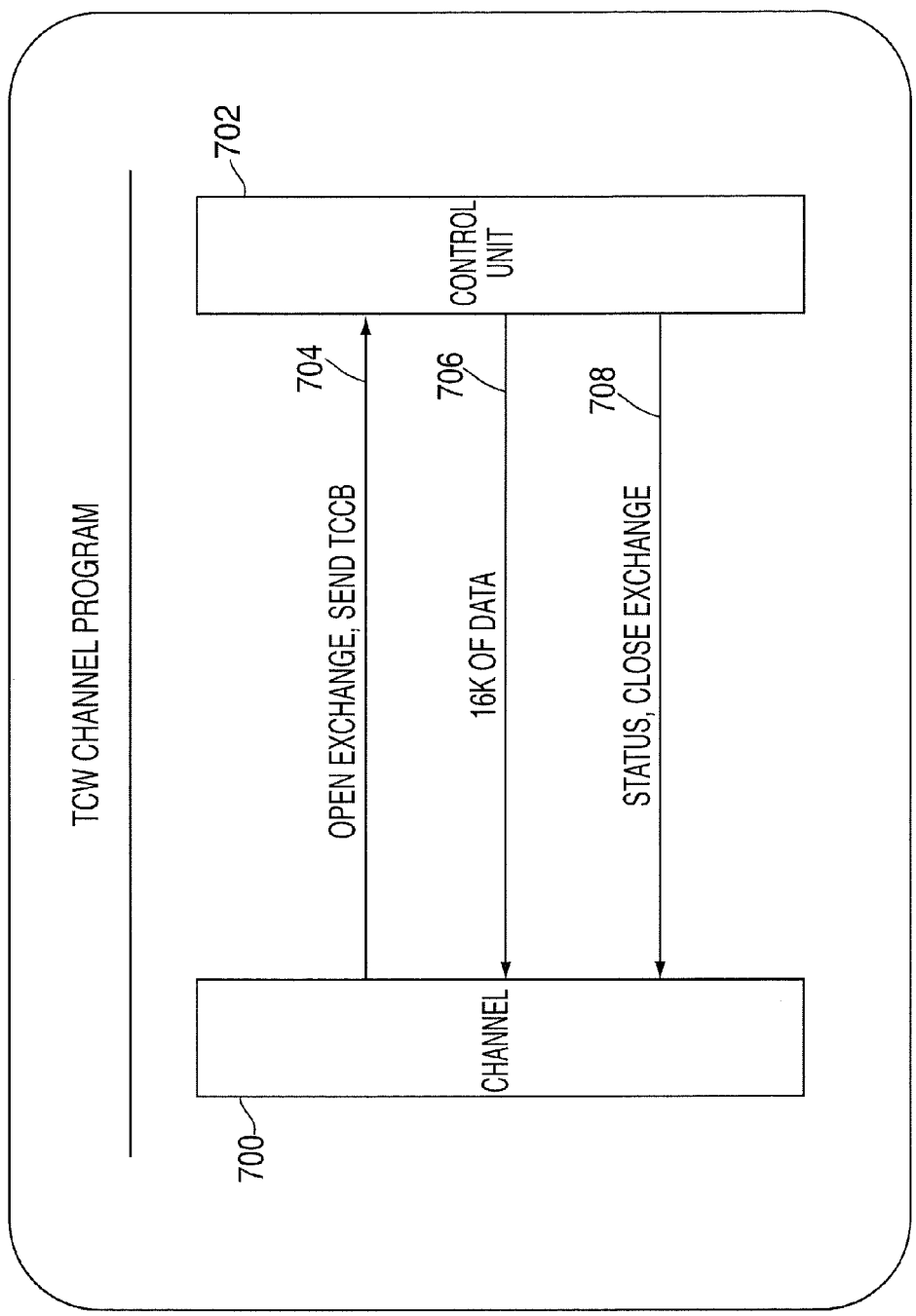
FIG. 7 depicts an exemplary embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
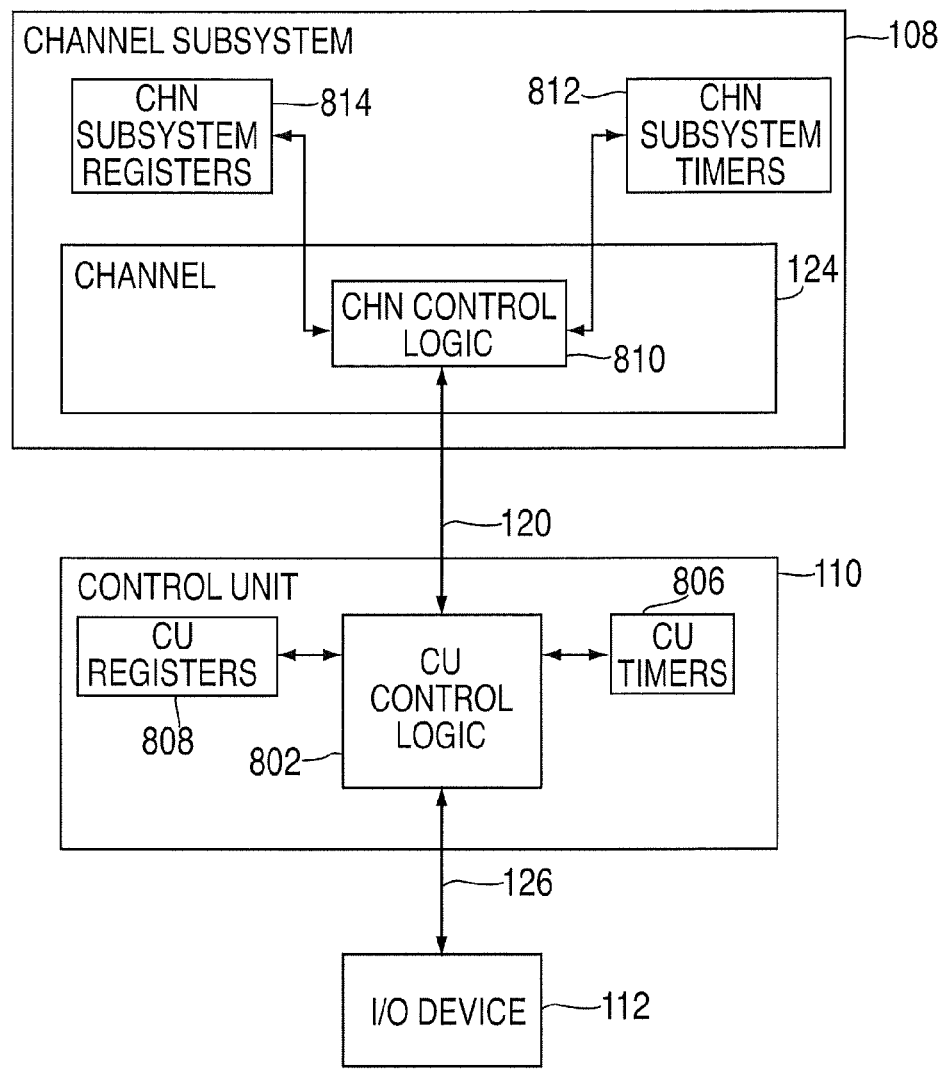
FIG. 8 depicts an exemplary embodiment of a control unit and a channel, in accordance with an aspect of the present invention.

Turning now to FIG. 8, one embodiment of the control unit 110 and the channel 124 of FIG. 1 that support TCW channel program execution is depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, as well as receives status information and other feedback from the I/O device 112.

The CU control logic 802 can access and control other elements within the control unit 110, such as CU timers 806 and CU registers 808. The CU timers 806 may include multiple timer functions to track how much time a sequence of I/O operations takes to complete. The CU timers 806 may further include one or more countdown timers to monitor and abort I/O operations and commands that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to track how much time a sequence of I/O operations takes to complete, in addition to the time tracked by the control unit 110. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

In an exemplary embodiment, the CCW channel program is implemented using a protocol that includes Channel Command Words, for example, a Fibre Connectivity (FICON) protocol. Links operating under this protocol may be referred to as being in a "Command Mode".

In an exemplary embodiment, the TCW channel program is implemented using a protocol to execute Transport Control Words, for example, the transport mode protocol.

In some exemplary embodiments, the control unit 110 and the channel 124 may operate in different modes, i.e., use different protocols. For example, the channel 124 may operate in transport mode which utilizes the FCP link protocol, and the control unit 110 may operate in command mode that utilizes the FICON protocol.

In a ships passing condition, the control unit 110 and the channel 124 each send a message at approximately the same time, or otherwise send messages that cross paths in a logical path. In such a condition, the channel 124 sends a message (e.g., a command message) to the control unit 110 and receives an unrelated or non-responsive message in return. Similarly, the control unit 110 sends a message (e.g., a status message) to the channel 124 and receives an unrelated or non-responsive message in return.

In an exemplary embodiment, when the channel 124 sends a command message to the control unit 110, and receives an unsolicited message from the control unit 110 that is not responsive to the command message, the channel 124 determines or recognizes that a ships passing condition has occurred. The channel 124 sends a response message to the control unit 110 in response to the message from the control unit being not responsive to the command. In one exemplary embodiment, the response message from the channel 124 indicates that the message has not been accepted.

In this exemplary embodiment, the control unit 110 sends the unsolicited message, and thereafter receives the command message from the channel 124 that is not responsive to the unsolicited message. The control unit thus determines that the command is not responsive to the unsolicited message, and in response determines whether to execute or terminate the command. In another exemplary embodiment, the control unit 110 may wait for a response from the channel 124 that the message was not accepted. If the control unit 110 receives the response, it determines whether to execute the command or terminate the command.

In another exemplary embodiment, after sending the command message in the first mode (e.g., transport mode protocol) to the control unit 110 and receiving a non-responsive message in the second mode (e.g., FICON), the channel 124 sends a message to the control unit 110 in the second mode, in response to the non-responsive message. Upon receiving the response message in the second mode, the control unit 110 may then determine whether to terminate or execute the command message, and send a response message in the first mode.

In an exemplary embodiment, upon receiving a non-responsive message from the control unit 110, such as a status message, the channel 124 stacks the status received. The channel 124 may enable a timer to ensure that the protocol for stacking the status completes in a timely fashion. After the status is stacked, and optionally after the original transport mode operation the channel 124 started completes, the channel 124 may make a request to the control unit 110 for possible stacked status.

In an exemplary embodiment, the channel 124 stacks the status by sending a "stack status" message to the control unit 110 in response to the status message. The stack status message indicates to the control unit 110 that the status message is not accepted. The control unit 110 may then hold the device status information (status flags, status byte, and status parameter) and associated supplemental status, if any, until the status is requested by the channel 124, e.g., via a request-status message, or present the status as the response to the command message. For brevity, a control message indicating stack status is referred to as a stack-status information unit (IU). A stack-status IU may be sent as the first and last sequence of an exchange if it is sent in response to the status message from the control unit 110. The control unit 110 may indicate to the channel 124 that it recognized the stack-status IU by sending a device-level acknowledgement (DACK) IU. The channel 124 may consider the stack-status function to have been performed when it receives a DACK IU in response to the stack-status IU.

In an exemplary embodiment, upon receiving a response to the status message (e.g., a stack-status IU), the control unit 110 may determine whether to terminate the command message or execute the command message. In another exemplary embodiment, if the control unit 110 executes the command, it sends appropriate indications and status to the channel 124 via a response message. If the control unit 110 terminates the command, it sends the original status (included in the original status message) to the channel 124 via the response message. In yet another exemplary embodiment, the control unit 110 may send the response message in the transport mode, as a "Transport Response IU".

In an exemplary embodiment, the control unit 110 determines whether to execute or terminate the command based on the type of status the control unit 110 has pending pertaining to the device. For example, if the status pertains to a new state of the device, then the control unit 110 may terminate the command and return that status in response to the Transport Command IU. In another example, if the status is some low priority status that does not pertain to the current operational state of the device, then the control unit 110 may execute the command message.

In an exemplary embodiment, the channel 124 sends the command message in the transport mode, and the control unit 110 sends the status message in the command mode. In stacking the status received, the channel 124 may send the stack status message in the command mode, and await a command mode acknowledgement from the control unit 110. In another exemplary embodiment, the channel 124 may send the stack status message in transport mode and the control unit 110 then returns the response message in transport mode.

Exemplary embodiments of the processing of messages and/or programs in a ships passing situation are described with reference to FIGS. 9-15. The link protocol used for these communications is, for instance, Fibre Channel Protocol (FCP).

In the examples described herein, the channel 905, which is operating in transport mode, sends a Transport Command IU that contains the TCCB, using the transport mode protocol, to the control unit. The Transport Command IU may also be referred to as a "TCCB IU". The control unit 910, which is operating in command mode, sends an unsolicited status IU using the FICON protocol, independently of the command IU. The protocols used, and the information units sent from the channel 905 and control unit 910, are exemplary and provided for illustration purposes. Any suitable messages or protocols may be used in a selected I/O operation.

The unsolicited IU sent by the control unit may take the form of an Asynchronous Device Status IU using the FICON protocol, which is sent to the channel 905 over the same logical path and for the same device. This unsolicited IU is also referred to as a "FICON 85 STATUS" IU.

In these examples, both the channel 905 and the control unit 910 recognize that the TCCB and FICON 85 STATUS IUs have crossed, and thus both the channel 905 and control unit 910 have received messages that are not responsive to their respective messages. In response to this ships passing condition, the channel 905 stacks the status received in the FICON 85 STATUS IU by generating a "Stack Status" IU in the FICON protocol, also referred to as "FICON Stack".

Examples of embodiments of the method described herein are further described below, with reference to FIGS. 9-15. The exemplary embodiment described with reference to FIG. 9 describes a procedure for processing data in a ships passing condition. The exemplary embodiments described with reference to FIGS. 10-15 describe alternative embodiments of the procedure where various messages have been lost. The loss of a message is represented as a broken line portion shown in relation to a respective exchange.

Example 1

Ships Passing Condition

Figure 9:
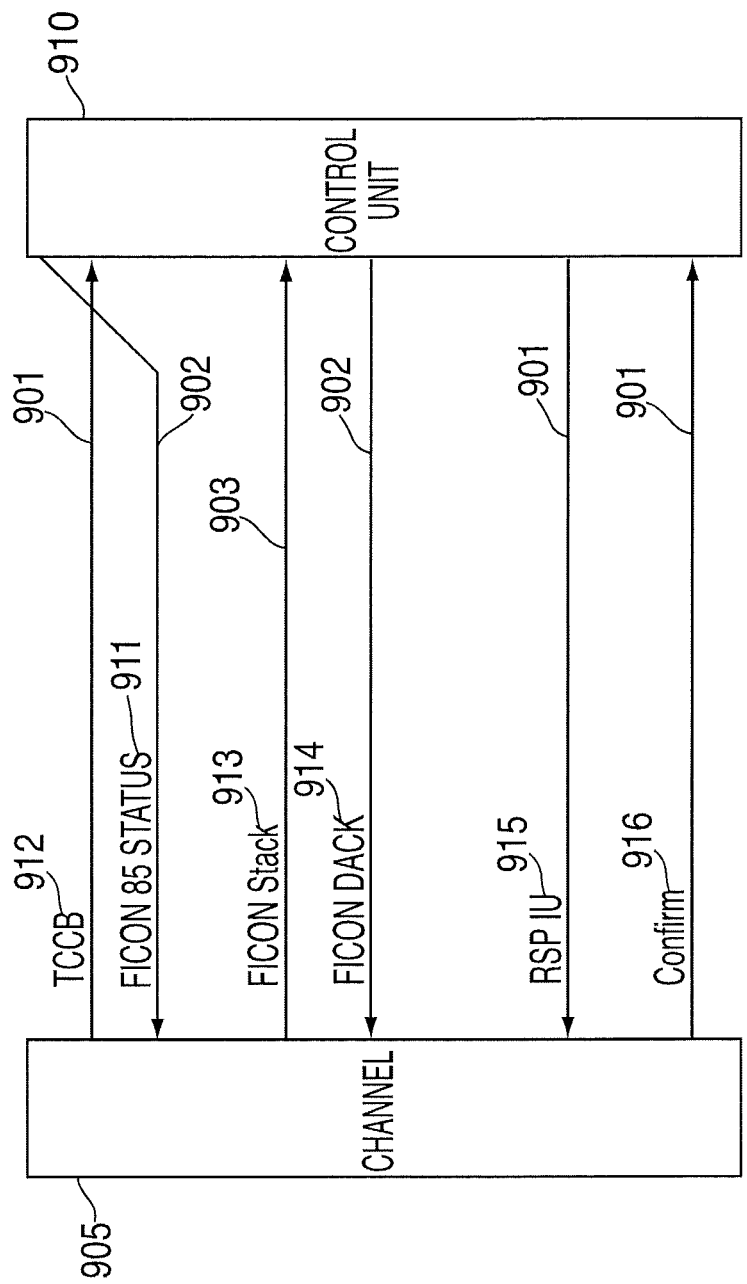
FIG. 9 depicts a first exemplary embodiment of a link protocol used to communicate between a channel and control unit to process messages between a channel and a control unit in a ships passing condition.

In the following example, a procedure for processing data in a ships passing condition is illustrated with reference to FIG. 9. The procedure for opening exchanges and exchanging various methods includes one or more of the following phases:

1. The control unit 910 opens an exchange 902 and sends the device status in the FICON 85 STATUS IU 911 to the channel 905 on the exchange 902. The control unit 910 may initiate a status timer set at a period of, for example, 1.5 seconds, for receiving an acknowledgement or other response to the FICON 85 STATUS IU 911 from the channel 905.

2. The channel 905 opens an exchange 901 and sends the TCCB IU 912 to the control unit 910 on the exchange 901. The channel 905 may also transfer sequence initiative on the exchange 901 to the control unit 910. The channel 905 may further start a timer, such as a 2 second timer, for receiving a status response IU from the control unit 910. In an exemplary embodiment, the timer period set by the channel 905 is between approximately one and twenty seconds.

3. The channel 905 receives the unsolicited FICON 85 STATUS IU 911 on exchange 902, by which it recognizes that the logical path and device associated with the control unit 910 has AS=1. AS=1 indicates that the "address specific" field in the FICON 85 STATUS IU 911 is valid. A ships passing mode is recognized when the device address field and the logical path in the FICON 85 STATUS IU 911 is equal to the device address field and logical path in the TCCB IU 912 that was sent to the control unit 910.

4. The channel 905 opens and closes an exchange 903 to the control unit 910, to stack the status in the FICON 85 STATUS IU 911 received from the control unit 910 on the exchange 902 and to send a stack status IU 913 on the exchange 903. The channel 905 may start a stack status timer (e.g., two seconds) for receipt of a device level acknowledgement (DACK) IU from the control unit 910. In an exemplary embodiment, the stack status IU 913 is sent to the control unit 910 in FICON format (referred to as "FICON Stack IU 913").

5. The control unit 910 receives the TCCB IU 912 on exchange 901, by which it recognizes that the logical path and device associated with the channel 905 is in ships passing mode because the TCCB IU 912 is specific to the device address of the FICON 85 STATUS IU 911 that was sent to the channel 905. The control unit 910 waits up to the status timer period set for a response to the FICON 85 STATUS IU 911.

6. The control unit 910 receives the FICON Stack IU 913 on exchange 903 and completes the FICON handshake by sending a response 914, such as a FICON device acknowledgement ("FICON DACK IU 914"). The control unit 910 may also close exchange 902.

7. The control unit 910 has the option, in response to the TCCB IU 912, to i) withdraw the device status sent in the FICON 85 STATUS IU 911 and execute the commands in the TCCB IU 912 received from the channel 905, or ii) send the device status to the channel 905.

In an exemplary embodiment, if the device status is withdrawn, the control unit executes the commands in the TCCB IU 912, and returns a response IU, such as a Status Response IU (RSP IU) IU 915, on the exchange 901. In another exemplary embodiment, if the device status is not withdrawn, the control unit 910 sends the device status in the Status Response IU 915 on exchange 901. The control unit 910 may transfer sequence initiative to the channel 905 if confirmation is requested, or close exchange 901 as appropriate. The device status may be sent in an appropriate field in a response IU (e.g. RSP IU 915), such as a "Device Status" field. In an exemplary embodiment, a "device busy" bit may also be sent along with the device status. In the above embodiments, the control unit 910, which originally sent the status via the FICON protocol, responds to the TCCB IU 912 via the transport mode protocol.

8. If confirmation of the RSP IU 915 is requested by the control unit 910, the control unit 910 may start a confirmation timer. The channel 905 closes exchange 901 with a Status Confirm IU 916 (i.e. "Confirm IU 916") in response to the RSP IU 915.

9. The channel 905 may present the device status, received from the RSP IU 915, to an I/O program or other location. The channel may also store the channel (or subchannel) status, to alert the software, for example, that the subchannel is primary, secondary and maybe alert status pending.

10. In an exemplary embodiment, the channel 905 may request the possible stacked status from the control unit 910, or otherwise request pending status, e.g., via a request-status IU.

Example 2

The TCCB IU 912 is Lost

Figure 10:
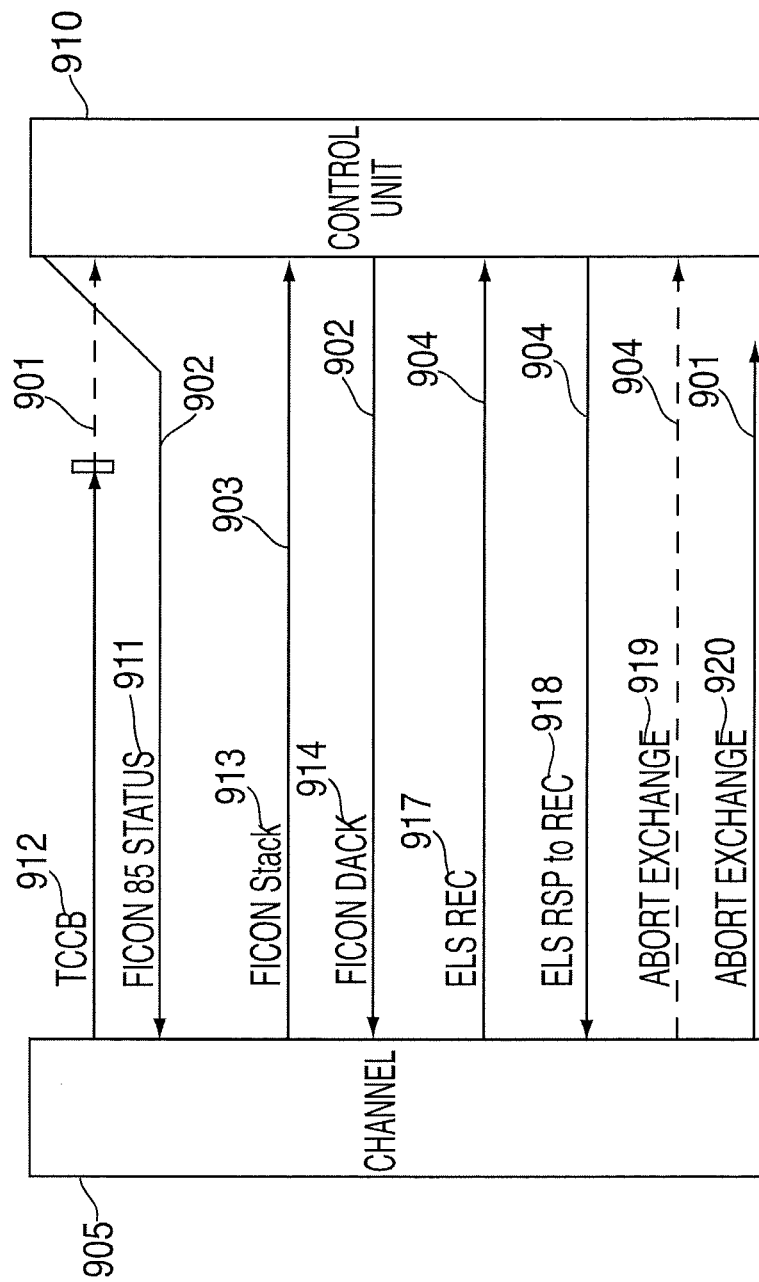
FIG. 10 depicts a second exemplary embodiment of a link protocol used to communicate between a channel and control unit to process messages between a channel and a control unit in a ships passing condition.

In the following example, a procedure for processing data in a ships passing condition is illustrated with reference to FIG. 10. In this example, the TCCB IU 912 is lost, i.e., is not received by the control unit 910. The procedure includes one or more of the following phases:

1. The control unit 910 sends the FICON 85 STATUS IU 911 to the channel 905, the channel 905 sends the TCCB IU 912 to the control unit 910, and the channel 905 recognizes the ships passing mode and stacks the device status, similar to phases 1-4 of Example 1.

2. The control unit 910 receives the FICON Stack IU 913 on the exchange 903 and completes the FICON handshake by sending a response 914, such as the FICON DACK IU 914. The control unit 910 may also close exchange 902.

3. If the channel 905 does not receive a status response IU to the TCCB IU within the status response IU timer period on the exchange 901, i.e., it times out, the channel 905 opens the exchange 904 and sends a request thereon to the control unit 910 to determine the status of the exchange 901, transfers initiative, and starts a request timer (e.g., one second). An example of such a request is an ELS (Extended Link Service) Read Exchange Concise (REC) IU 917.

The REC IU allows the channel 905 to determine the status of an exchange. The channel 905 may send the REC IU 917 to the control unit 910 to determine if the control unit 910 has received the TCCB IU 912 that opened the exchange 901. If the response the channel 905 receives indicates that the control unit 910 knows about the exchange, the channel 905 may then send a new REC IU periodically until an I/O operation is complete.

4. The channel 905 receives an REC response IU 918 from the control unit 910 that closes the exchange, and that informs the channel 905 that the control unit 910 has not received exchange 901. If the channel 905 does not receive the REC response IU 918 (e.g., because the REC or the Response to REC was lost) within the channel timer duration, the channel 905 aborts the exchange 904 (by performing abort sequence 919) and continues.

5. The channel 905 may then wait a selected duration (e.g., 100 ms), and thereafter perform abort sequence 920 to abort exchange 901, and stores the channel (or subchannel) status to alert the software, for example, that the subchannel is primary, secondary and alert status pending with an interface control check (IFCC).

6. In an exemplary embodiment, the channel 905 may request the possible stacked status from the control unit 910, or otherwise request pending status, e.g., via a request-status IU.

Example 3

The FICON 85 STATUS IU 911 is Lost

Figure 11:
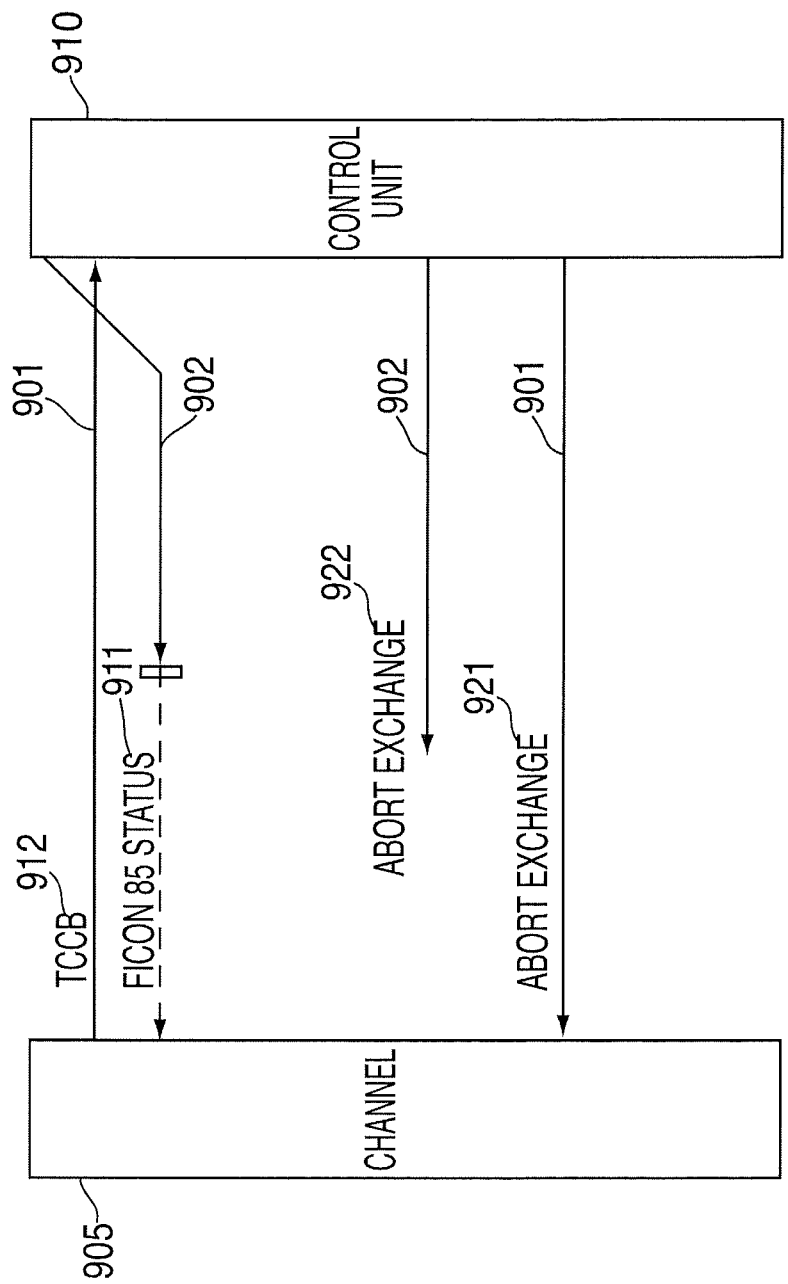
FIG. 11 depicts a third exemplary embodiment of a link protocol used to communicate between a channel and control unit to process messages between a channel and a control unit in a ships passing condition.

In the following example, a procedure for processing data in a ships passing condition is illustrated with reference to FIG. 11. In this example, the FICON 85 STATUS IU 911 is lost, i.e., is not received by the channel 905. The procedure includes one or more of the following phases:

1. The control unit 910 sends the FICON 85 STATUS IU 911 to the channel 905, and the channel 905 sends the TCCB IU 912 to the control unit 910, similar to phases 1-2 of Example 1.

2. If the FICON 85 STATUS IU 911 is lost, the channel 905 does not see a ships passing condition, and in turn, does not send a FICON Stack IU 913 to the control unit 910. The control unit status timer times out, and in turn, the control unit 910 aborts the exchanges 901 and 902 via abort sequences 921 and 922, respectively.

3. The channel 905 detects that the exchange 901 is aborted, and stores the channel (or subchannel) status to alert the software, for example, that the subchannel is primary, secondary and alert status pending with an interface control check (IFCC).

4. The control unit 910 may re-send the unsolicited FICON 85 STATUS IU 911 on the current logical path or on a different path.

Example 4

The FICON Stack IU 913 is Lost

Figure 12:
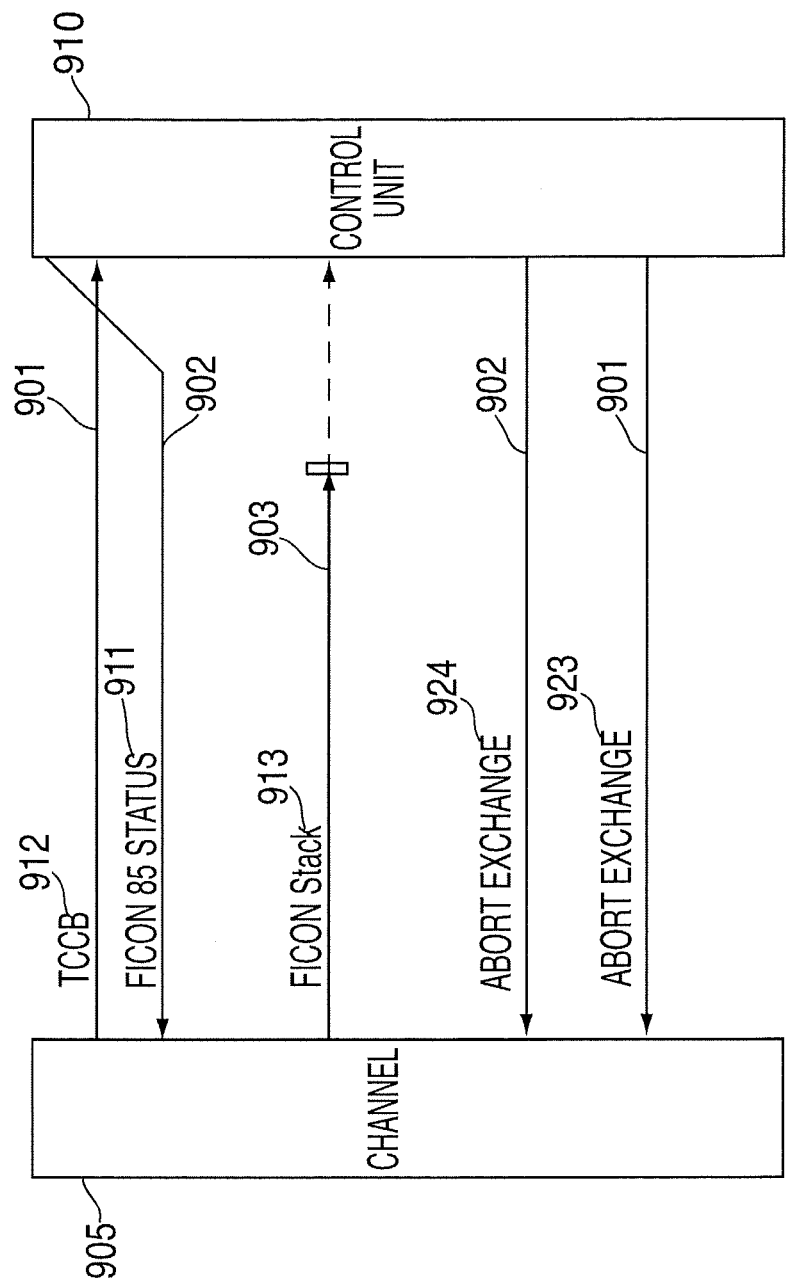
FIG. 12 depicts a fourth exemplary embodiment of a link protocol used to communicate between a channel and control unit to process messages between a channel and a control unit in a ships passing condition.

In the following example, a procedure for processing data in a ships passing condition is illustrated with reference to FIG. 12. In this example, the FICON Stack IU 913 is lost, i.e., is not received by the control unit 910. The procedure includes one or more of the following phases:

1. The control unit 910 sends the FICON 85 STATUS IU 911 to the channel 905, the channel 905 sends the TCCB IU 912 to the control unit 910, recognizes the ships passing mode and stacks the status. The control unit 910 receives the TCCB IU 912, recognizes the ships passing mode and waits for a response to the FICON 85 STATUS IU 911. This phase is similar to the procedure performed in phases 1-5 of Example 1.

2. If the FICON Stack IU 913 is lost, the control unit status timer times out, and the control unit 910 aborts exchanges 901 and 902 via abort sequences 923 and 924, respectively.

3. The channel 905 detects that exchanges 901 and 902 are aborted, and stores the channel (or subchannel) to alert the software, for example, that the subchannel is primary, secondary and alert status pending with an interface control check (IFCC).

4. The control unit 910 may re-send the unsolicited FICON 85 STATUS IU 911 on the current logical path or on a different path.

Example 5

The FICON DACK IU 914 is Lost

Figure 13:
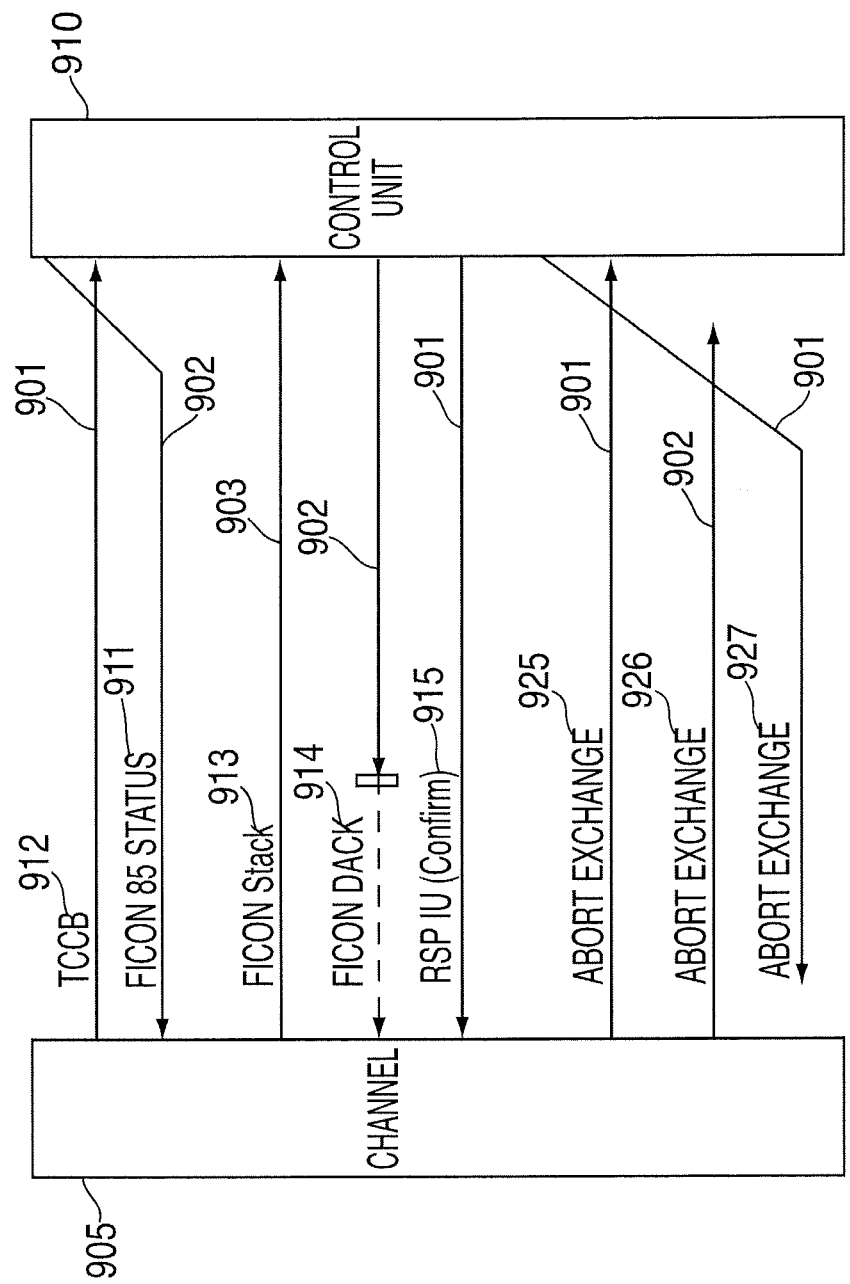
FIG. 13 depicts a fifth exemplary embodiment of a link protocol used to communicate between a channel and control unit to process messages between a channel and a control unit in a ships passing condition.

In the following example, a procedure for processing data in a ships passing condition is illustrated with reference to FIG. 13. In this example, the FICON DACK IU 914 is lost, i.e., is not received by the channel 905. The procedure includes one or more of the following phases:

1. The control unit 910 sends the FICON 85 STATUS IU 911 to the channel 905, and the channel 905 sends the TCCB IU 912 to the control unit 910. The channel 905 recognizes the ships passing mode and stacks the status. The control unit 910 receives the TCCB IU 912, recognizes the ships passing mode and waits for a response to the FICON 85 STATUS IU 911. This phase is similar to the procedure performed in phases 1-5 of Example 1.

2. The control unit 910 receives the FICON Stack IU 913 on the exchange 903 and completes the FICON handshake by sending the FICON DACK IU 914 to the channel 905. The control unit 910 may close exchange 902.

3. If the FICON DACK IU 914 is lost, the channel's stack status timer times out on the exchange 902 waiting for the FICON DACK IU 914. The channel 905 aborts both exchange 901 and exchange 902 via abort sequences 925 and 926, respectively.

4. Alternatively, if the control unit 910 sends the Status Response IU 915 on the exchange 901 with confirmation requested, the control unit 910 may also time out (i.e., the confirmation timer times out). The control unit may then abort the exchange 901, via abort sequence 927, after sending the Status Response IU 915.

5. The control unit 910 may re-send the unsolicited FICON 85 STATUS IU 911 on the current path or on a different path in the same logical path group.

Example 6

The RSP IU 915 is Lost

Figure 14:
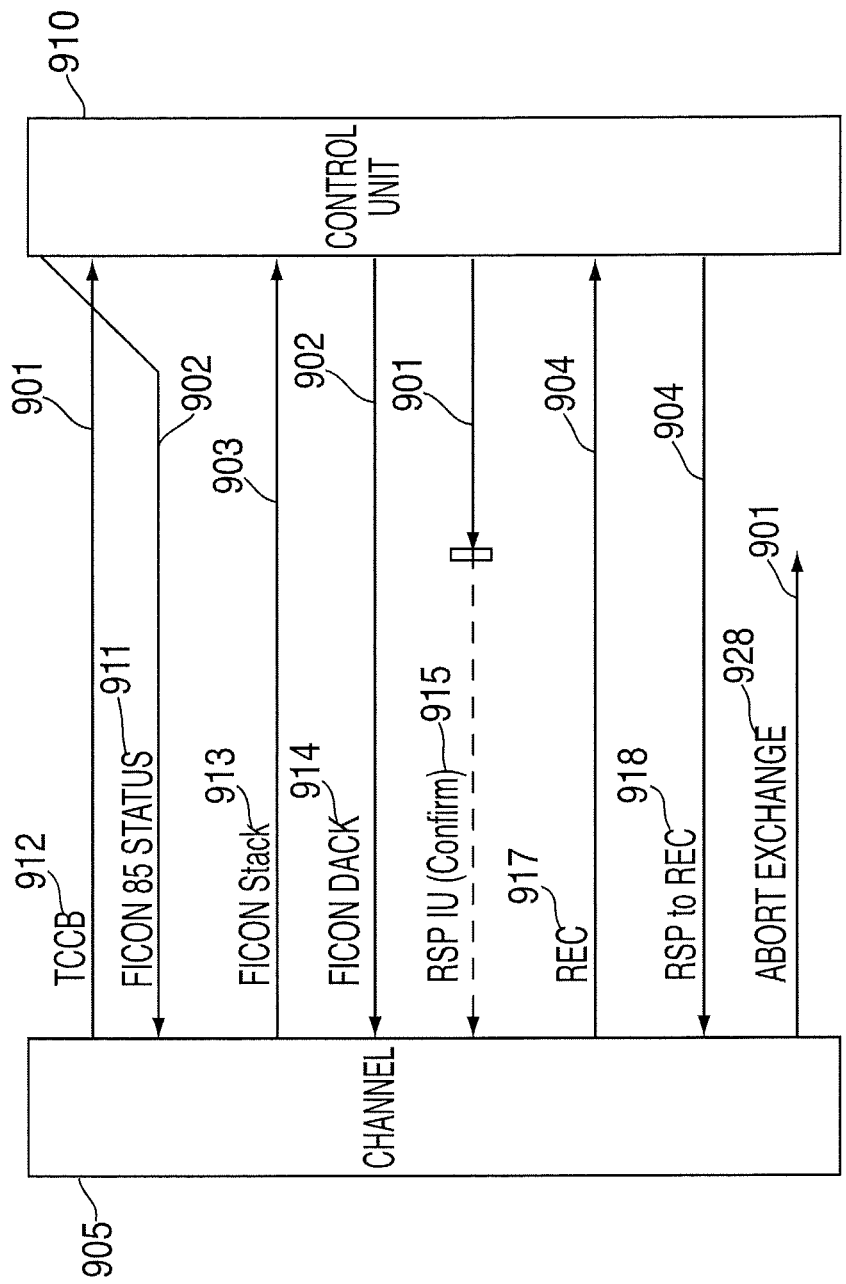
FIG. 14 depicts a sixth exemplary embodiment of a link protocol used to communicate between a channel and control unit to process messages between a channel and a control unit in a ships passing condition.

In the following example, a procedure for processing data in a ships passing condition is illustrated with reference to FIG. 14. In this example, the RSP IU 915 is lost, i.e., is not received by the channel 905. The procedure includes one or more of the following phases:

1. The control unit 910 sends the FICON 85 STATUS IU 911 to the channel 905, the channel 905 sends the TCCB IU 912 to the control unit 910, recognizes the ships passing mode, stacks the status, and sends the FICON Stack IU 913 to the control unit 910. The control unit 910 receives the TCCB IU 912, recognizes the ships passing mode, and sends the FICON DACK IU 914 to the channel 905. The control unit 910 sends the RSP IU 915 to the channel 905 on Exchange 901. This phase is similar to the procedure performed in phases 1-7 of Example 1.

2. If the RSP IU 915 sent in response to the TCCB IU 912 is lost, the channel 905 does not receive the RSP IU 915. The channel 905 times out (i.e., the status response IU timer times out) waiting for the RSP IU 915. In response, the channel 905 opens the exchange 904 and sends the ELS REC IU 917 for the exchange 901 to the control unit and starts a (e.g., 1 second) request timer.

3. The control unit 910 sends a response, i.e., a REC response 918, to the channel 905 that closes the exchange 904, and that informs the channel 905 that the control unit 910 does not have the exchange 901. This only occurs if the control unit 910 did not ask for a confirm to the RSP IU 915 and closed the exchange 901 when it sent the status RSP IU 915 to the channel 905. If the control unit requests a confirm on the RSP IU 915 then the control unit leaves the exchange 901 open and transfers transfer sequence initiative to the channel 905.

In one exemplary embodiment, the control unit 910 may request a confirm to the RSP IU 915 if the command operation may be retried. For example, a read or a write to a direct access storage device (DASD) can be retried and the end result is the same as if the original operation was successful. In this case, the control unit 910 may have completed the command operation when the status response IU 915 is lost and the control unit did not ask for the status to be confirmed.

If the command operation cannot be retried, then the control unit 910 handles this by asking for a confirm to the status response IU 915. In this case, if the control unit 910 times out waiting for the confirm, then the control unit may resend the status to the channel 905 for that device and will not accept a new operation for that device until the status has been successfully sent to the channel 905.

4. The channel may then wait a selected duration (e.g., 100 ms), abort the exchange 901 via abort sequence 928, and store the channel (or subchannel) status to alert the software, for example, that the subchannel is primary, secondary and alert status pending with an interface control check (IFCC).

5. In an exemplary embodiment, the channel 905 may request the possible stacked status from the control unit 910, or otherwise request pending status, e.g., via a request-status IU.

Example 7

The Confirm IU 916 is Lost

Figure 15:
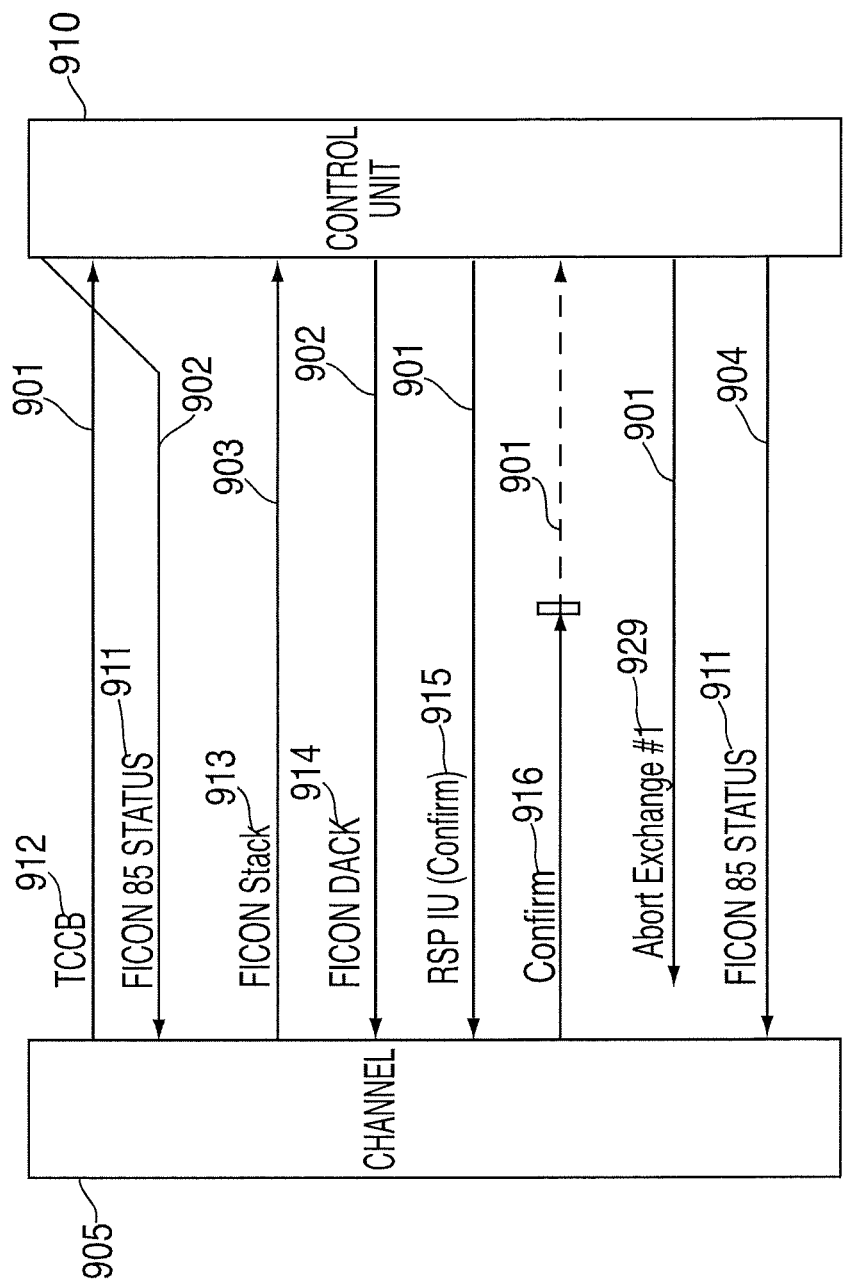
FIG. 15 depicts a seventh exemplary embodiment of a link protocol used to communicate between a channel and control unit to process messages between a channel and a control unit in a ships passing condition.

In the following example, a procedure for processing data in a ships passing condition is illustrated with reference to FIG. 15. In this example, the Confirm IU 916 is lost, i.e., is not received by the channel 905. The procedure includes one or more of the following phases:

1. The control unit 910 sends the FICON 85 STATUS IU 911 to the channel 905, the channel 905 sends the TCCB IU 912 to the control unit 910, recognizes the ships passing mode, stacks the status, and sends the FICON Stack IU 913 to the control unit 910. The control unit 910 receives the TCCB IU 912, recognizes the ships passing mode, and sends the FICON DACK IU 914 to the channel 905. The control unit 910 sends the RSP IU 915 to the channel 905 on exchange 901. This phase is similar to the procedure performed in phases 1-7 of Example 1.

2. If the RSP IU 915 is sent by the control unit 910, and confirmation is required, the channel 905 sends the Status Confirm IU 916 in exchange 901 in response to the RSP IU 915. If the control unit 910 does not receive the Status Confirm IU 916, then the control unit 910 times out and aborts exchange 901 via abort sequence 929.

3. The control unit 910 may then re-send the unsolicited FICON 85 STATUS IU 911 to the channel 905. FICON 85 STATUS IU 911 may be re-sent on exchange 904. In this example, the unsolicited FICON 85 STATUS IU 911 is sent to the channel 905 twice.

The naming and numbering conventions described in the above examples are exemplary and provided to illustrate the method described herein. The naming and number convention provided is arbitrarily chosen, and is provided for explanation only.

Furthermore, the protocols and specific messages described in the above examples are exemplary. Any suitable I/O protocols and associated messages may be processed as described herein.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or provided separately.

DETAILED DESCRIPTION

Figure 16:
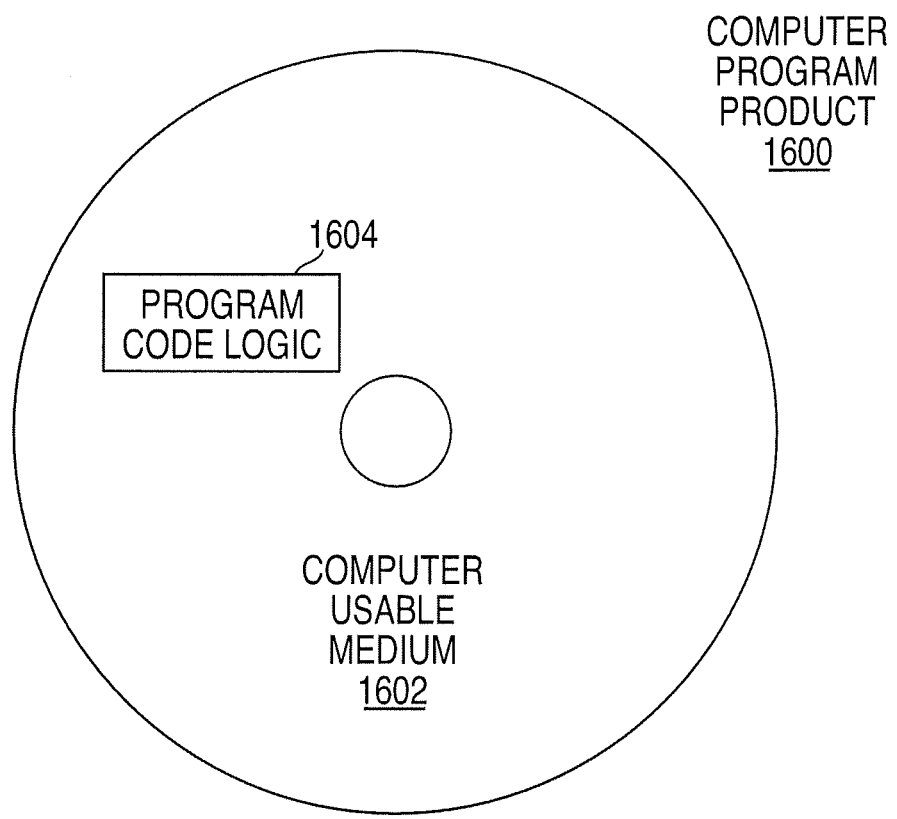
FIG. 16 depicts an exemplary embodiment of an article of manufacture incorporating one or more aspects of the present invention.

One example of an article of manufacture or a computer program product incorporating one or more aspects of the present invention is described with reference to FIG. 16. A computer program product 1600 includes, for instance, one or more computer usable media 1602 to store computer readable program code means or logic 1604 thereon to provide and facilitate one or more aspects of the present invention. The medium can be an electronic, magnetic, optical, electromagnetic, infrared or semiconductor system (or apparatus or device) or a propagation medium. Example of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

Technical effects of exemplary embodiments include the ability of I/O processing systems to resolve ships passing conditions among I/O components using disparate protocols. In addition, the control unit may determine independently of the channel whether to execute a command in a ships passing condition. The systems and methods described herein provide numerous advantages, in that they provide an efficient way to process data in a ships passing condition, and further provide for processing messages and data sent from disparate protocols.

For example, ships passing rules utilized in one protocol or mode may not work with other protocols or modes. For example, a protocol using CCWs (e.g., FICON), may not work with other protocols, such as protocols using TCWs (e.g., transport mode). The transport mode link protocol is not amiable to the FICON behavior because once a transport mode link operation is started by a channel (e.g., a transport mode command is sent on an outbound exchange to the control unit), there is no way for the channel to efficiently discontinue the transport mode link operation. The control unit cannot use the inbound FICON status exchange opened by the control unit to complete or terminate the transport mode link operation. The channel and control unit must stay in sync with each other while sorting out the two open exchanges, even if an IU is lost on an exchange. The systems and methods described herein allow the control unit to complete or terminate the operation, thus overcoming the disadvantages described above. In addition, using the protocols described herein, the channel and control unit need not stay in sync with each other while resolving the open exchanges involved in the ships passing condition.

As described above, exemplary embodiments can be embodied in the form of computer-implemented processes and apparatuses for practicing those processes. In some exemplary embodiments, the invention is embodied in computer program code executed by one or more network elements. Exemplary embodiments include the computer program product 1600 as depicted in FIG. 16 on the computer usable medium 1602 with computer program code logic 1604 containing instructions embodied in tangible media as an article of manufacture. Exemplary articles of manufacture for computer usable medium 1602 may include floppy diskettes, CD-ROMs, hard drives, universal serial bus (USB) flash drives, or any other computer-readable storage medium, wherein, when the computer program code logic 1604 is loaded into and executed by a computer, the computer becomes an apparatus for practicing the invention. Exemplary embodiments include computer program code logic 1604, for example, whether stored in a storage medium, loaded into and/or executed by a computer, or transmitted over some transmission medium, such as over electrical wiring or cabling, through fiber optics, or via electromagnetic radiation, wherein, when the computer program code logic 1604 is loaded into and executed by a computer, the computer becomes an apparatus for practicing the invention. When implemented on a general-purpose microprocessor, the computer program code logic 1604 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing communication data in a ships passing condition, the computer program product comprising:
a non-transitory tangible storage medium readable by a processing circuit and storing instructions for execution by the processing circuit for performing a method comprising:

obtaining a Transport Command Control Block (TCCB) from a location in memory specified by a Transport Command Control Block address of a Transport Control Word;

opening a first exchange and sending, by a channel subsystem, the TCCB in the first exchange to a control unit, the TCCB comprising a first logical path value and a first device value;

receiving, by the channel subsystem, an unsolicited first message in a second exchange from the control unit, the unsolicited first message comprising a second logical path value and a second device value, the unsolicited first message opening the second exchange, the second exchange being a different exchange than the first exchange;

responsive to the receiving the unsolicited first message and the first exchange and second exchange being opened, determining that the first logical path value is equal to the second logical path value and the first device value is equal to the second device value;

based on the determination, sending, by the channel subsystem, a second message to the control unit in a third exchange, the second message comprising a status of the first message, the second message configured to open and close the third exchange; and initiating, by the channel subsystem, a timer defining a time period for receiving a response to the second message from the control unit.

2. The computer program product of claim 1, wherein the method further comprises initiating, by the channel subsystem, timer defining a time period for receiving a response to the TCCB from the control unit.

3. The computer program product of claim 1, wherein the second message is a stack status message indicating the unsolicited first message is not accepted.

4. The computer program product of claim 1, wherein the method further comprises receiving, by the channel subsystem, at least one of:

a response to the second message from the control unit on the second exchange, the response acknowledging receipt of the second message; and a TCCB response message from the control unit on the first exchange in response to the TCCB, the TCCB response message including one of: an indication that the control unit has executed one or more commands from the TCCB, and an indication that the control unit is terminating one or more commands from the TCCB.

5. The computer program product of claim 4, wherein receiving the TCCB response message includes, responsive to the control unit terminating the one or more commands, re-receiving the first message from the control unit in the first exchange.

6. The computer program product of claim 4, wherein the method further comprises, responsive to the TCCB response message requesting confirmation, sending a confirmation message to the control unit in the first exchange indicating that the channel subsystem has received the TCCB response message.

7. The computer program product of claim 6, wherein, responsive to the control unit not receiving the confirmation message, the method further comprises re-receiving the first message from the control unit by the channel subsystem in a fourth exchange.

8. The computer program product of claim 1, wherein the method further comprises initiating, by the channel subsystem, a timer defining a time period for receiving a TCCB response message from the control unit on the first exchange in response to the TCCB; and responsive to the channel subsystem not receiving a TCCB response within the time period, opening a fourth exchange and sending a status message to the control unit on the fourth exchange, the status message configured to request a status of the control unit;

receiving a status response message from the control unit on the fourth exchange in response to the status message, the status response message indicating whether the control unit has received the TCCB on the first exchange; and responsive to the response message indicating that the control unit has not received the TCCB, aborting the first exchange.

9. The computer program product of claim 1, wherein the method further comprises detecting that at least one of the first exchange and the second exchange have been aborted by the control unit in response to the control unit not receiving the second message within a time period set by the control unit.

10. The computer program product of claim 1, wherein the method further comprises:

responsive to not receiving the response to the second message within the time period, aborting the first exchange and the second exchange.

11. The computer program product of claim 1, wherein the TCCB is configured to hold a plurality of commands and sending the TCCB includes sending one or more of the plurality of commands to the control unit via the TCCB.

12. An apparatus for processing communication data in a ships passing condition, the apparatus comprising:

a channel subsystem for communication with a control unit, the channel subsystem including one or more channels for directing information flow between memory and one or more I/O devices via the control unit, the channel subsystem configured to perform a method comprising:

obtaining a Transport Command Control Block (TCCB) from a location in memory specified by a Transport Command Control Block address of a Transport Control Word;

opening a first exchange and sending the TCCB in the first exchange to a control unit, the TCCB comprising a first logical path value and a first device value;

receiving an unsolicited first message in a second exchange from the control unit, the unsolicited first message comprising a second logical path value and a second device value, the unsolicited first message opening the second exchange, the second exchange being a different exchange than the first exchange;

responsive to the receiving the unsolicited first message and the first exchange and second exchange being opened, determining that the first logical path value is equal to the second logical path value and the first device value is equal to the second device value;

based on the determination, sending a second message to the control unit in a third exchange, the second message comprising a status of the first message, the second message configured to open and close the third exchange; and initiating, by the channel subsystem, a timer defining a time period for receiving a response to the second message from the control unit.

13. The apparatus of claim 12, wherein the method further comprises receiving, by the channel subsystem, at least one of:

- a response to the second message from the control unit on the second exchange, the response acknowledging receipt of the second message; and
- a TCCB response message from the control unit on the first exchange in response to the TCCB, the TCCB response message including one of: an indication that the control unit has executed one or more commands from the TCCB, and an indication that the control unit is terminating one or more commands from the TCCB.

14. The apparatus of claim 13, wherein receiving the TCCB response message includes, responsive to the control unit terminating the one or more commands, re-receiving the first message from the control unit in the first exchange.

15. The apparatus of claim 13, wherein the method further comprises, responsive to the TCCB response message requesting confirmation, sending a confirmation message to the control unit in the first exchange indicating that the channel subsystem has received the TCCB response message.

16. The apparatus of claim 12, wherein the method further comprises initiating, by the channel subsystem, a timer defining a time period for receiving a TCCB response message from the control unit on the first exchange in response to the TCCB; and

- responsive to the channel subsystem not receiving a TCCB response within the time period, opening a fourth exchange and sending a status message to the control unit on the fourth exchange, the status message configured to request a status of the control unit;
- receiving a status response message from the control unit on the fourth exchange in response to the status message, the status response message indicating whether the control unit has received the TCCB on the first exchange; and
- responsive to the response message indicating that the control unit has not received the TCCB, aborting the first exchange.

17. The apparatus of claim 12, wherein the method further comprises detecting that at least one of the first exchange and the second exchange have been aborted by the control unit in response to the control unit not receiving the second message within a time period set by the control unit.

18. The apparatus of claim 12, wherein the method further comprises:

- responsive to not receiving the response to the second message within the time period, aborting the first exchange and the second exchange.

19. A method of processing communication data in a ships passing condition, the method comprising:

- obtaining a Transport Command Control Block (TCCB) from a location in memory specified by a Transport Command Control Block address of a Transport Control Word;
- opening a first exchange and sending, by a channel subsystem, the TCCB in the first exchange to a control unit, the TCCB comprising a first logical path value and a first device value;
- receiving, by the channel subsystem, an unsolicited first message in a second exchange from the control unit, the unsolicited first message comprising a second logical path value and a second device value, the unsolicited first message opening the second exchange, the second exchange being a different exchange than the first exchange;
- responsive to the receiving the unsolicited first message and the first exchange and second exchange being opened, determining that the first logical path value is equal to the second logical path value and the first device value is equal to the second device value;
- based on the determination, sending, by the channel subsystem, a second message to the control unit in a third exchange, the second message comprising a status of the first message, the second message configured to open and close the third exchange; and
- initiating, by the channel subsystem, a timer defining a time period for receiving a response to the second message from the control unit.

20. The method of claim 19, wherein the method further comprises receiving, by the channel subsystem, at least one of:

- a response to the second message from the control unit on the second exchange, the response acknowledging receipt of the second message; and
- a TCCB response message from the control unit on the first exchange in response to the TCCB, the TCCB response message including one of: an indication that the control unit has executed one or more commands from the TCCB, and an indication that the control unit is terminating one or more commands from the TCCB.

21. The method of claim 20, wherein receiving the TCCB response message includes, responsive to the control unit terminating the one or more commands, re-receiving the first message from the control unit in the first exchange.

22. The method of claim 20, wherein the method further comprises, responsive to the TCCB response message requesting confirmation, sending a confirmation message to the control unit in the first exchange indicating that the channel subsystem has received the TCCB response message.

23. The method of claim 19, wherein the method further comprises initiating, by the channel subsystem, a timer defining a time period for receiving a TCCB response message from the control unit on the first exchange in response to the TCCB; and

- responsive to the channel subsystem not receiving a TCCB response within the time period, opening a fourth exchange and sending a status message to the control unit on the fourth exchange, the status message configured to request a status of the control unit;
- receiving a status response message from the control unit on the fourth exchange in response to the status message, the status response message indicating whether the control unit has received the TCCB on the first exchange; and
- responsive to the response message indicating that the control unit has not received the TCCB, aborting the first exchange.

24. The method of claim 19, wherein the method further comprises detecting that at least one of the first exchange and the second exchange have been aborted by the control unit in response to the control unit not receiving the second message within a time period set by the control unit.

25. The method of claim 19, wherein the method further comprises:

- responsive to not receiving the response to the second message within the time period, aborting the first exchange and the second exchange.

* * * * *